(12) United States Patent  (10) Patent No.: US 8,581,728 B2
Howarth et al.  (45) Date of Patent: Nov. 12, 2013

(54) INVENTORY DEVICES AND METHODS

(75) Inventors: Arthur G. Howarth, Orleans (CA); Prasad Miriyala, Union City, CA (US); Chandrodaya Prasad, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/495,872

(22) Filed: Jun. 13, 2012

(65) Prior Publication Data

US 2012/0262278 A1  Oct. 18, 2012

Related U.S. Application Data

(62) Division of application No. 11/867,623, filed on Oct. 4, 2007, now Pat. No. 8,212,674.

(51) Int. Cl.
*G08B 13/14* (2006.01)
(52) U.S. Cl.
USPC ....... 340/572.1; 340/10.1; 340/5.92; 235/385
(58) Field of Classification Search
USPC ...................................................... 340/572.1
See application file for complete search history.

(56) References Cited

U.S. PATENT DOCUMENTS

| | | | |
|---|---|---|---|
| 5,774,876 A | 6/1998 | Woolley et al. | |
| 6,249,227 B1 | 6/2001 | Brady et al. | |
| 6,401,157 B1 | 6/2002 | Nguyen et al. | |
| 6,509,828 B2 | 1/2003 | Bolavage et al. | |
| 6,903,360 B2 | 6/2005 | McAuliffe | |
| 6,970,518 B2 | 11/2005 | Kuffner et al. | |
| 7,202,790 B2 | 4/2007 | Copeland et al. | |
| 7,212,116 B2 | 5/2007 | Wang et al | |
| 7,215,042 B2 | 5/2007 | Yan | |
| 7,219,834 B2 | 5/2007 | Chang | |
| 7,280,833 B2 | 10/2007 | Suda et al. | |
| 7,323,992 B2 | 1/2008 | Doan et al. | |
| 7,394,372 B2 | 7/2008 | Gloekler et al. | |
| 8,063,782 B2 | 11/2011 | Miriyala et al. | |
| 8,212,674 B2 | 7/2012 | Howarth et al. | |
| 2002/0190845 A1 | 12/2002 | Moore | |
| 2005/0156711 A1 | 7/2005 | Aljadeff et al. | |
| 2005/0197844 A1 | 9/2005 | Ng et al. | |
| 2005/0207381 A1 | 9/2005 | Aljadeff et al. | |
| 2006/0164246 A1 | 7/2006 | Ghosh | |

(Continued)

OTHER PUBLICATIONS

"Remote Inventory of Devices" Miriyala et al, U.S. Appl. No. 11/656,660, filed Jan. 22, 2007.

(Continued)

*Primary Examiner* — Kerri McNally
(74) *Attorney, Agent, or Firm* — Weaver Austin Villeneuve & Sampson LLP

(57) ABSTRACT

In one implementation, a method includes determining first component data by a first aggregation device at a first time, the first aggregation device being associated with a first one of a plurality of device components of a device, the first component data comprising identification data regarding at least a second one of the plurality of device components of the device. The first component data may be stored. A component request may be received
storing the first component data;
receiving a component request; and
providing the first component data via the wireless interface in response to the component request;
wherein the determining, storing, receiving, and providing steps are performed when the device is powered off.

20 Claims, 18 Drawing Sheets

(56) References Cited

U.S. PATENT DOCUMENTS

| | | | |
|---|---|---|---|
| 2007/0001850 A1* | 1/2007 | Malone et al. | 340/572.1 |
| 2007/0205894 A1* | 9/2007 | Nelson et al. | 340/572.1 |
| 2007/0222597 A1 | 9/2007 | Tourihes et al. | |
| 2007/0262877 A1* | 11/2007 | Hiraiwa et al. | 340/679 |
| 2008/0177969 A1* | 7/2008 | Miriyala et al. | 711/170 |
| 2008/0204232 A1 | 8/2008 | Argrawal et al. | |
| 2009/0091442 A1 | 4/2009 | Howarth et al. | |

OTHER PUBLICATIONS

Cisco Systems White Paper, "Benefits of Deploying Cisco Unified Communications Within A Cisco Intelligent Network," Sep. 2006, 17 pp.

US Non-Final Office Action dated Jan. 26, 2009 from related U.S. Appl. No. 11/656,660.

US Final Office Action dated Jul. 21, 2009 from related U.S. Appl. No. 11/656,660.

US Non-Final Office Action dated Dec. 24, 2009 from related U.S. Appl. No. 11/656,660.

US Final Office Action dated Jun. 28, 2010, from related U.S. Appl. No. 11/656,660.

US Notice of Allowance dated Oct. 12, 2010, from related U.S. Appl. No. 11/656,660.

US Notice of Allowance dated Apr. 1, 2011, from related U.S. Appl. No. 11/656,660.

US Non-Final Office Action dated Jul. 8, 2010 from related U.S. Appl. No. 11/867,623.

US Final Office Action dated Oct. 29, 2010 from related U.S. Appl. No. 11/867,623.

US Non-Final Office Action dated Jun. 24, 2011 from related U.S. Appl. No. 11/867,623.

US Final Office Action dated Oct. 18, 2011 from related U.S. Appl. No. 11/867,623.

US Notice of Allowance dated Mar. 5, 2012 from related U.S. Appl. No. 11/867,623.

\* cited by examiner

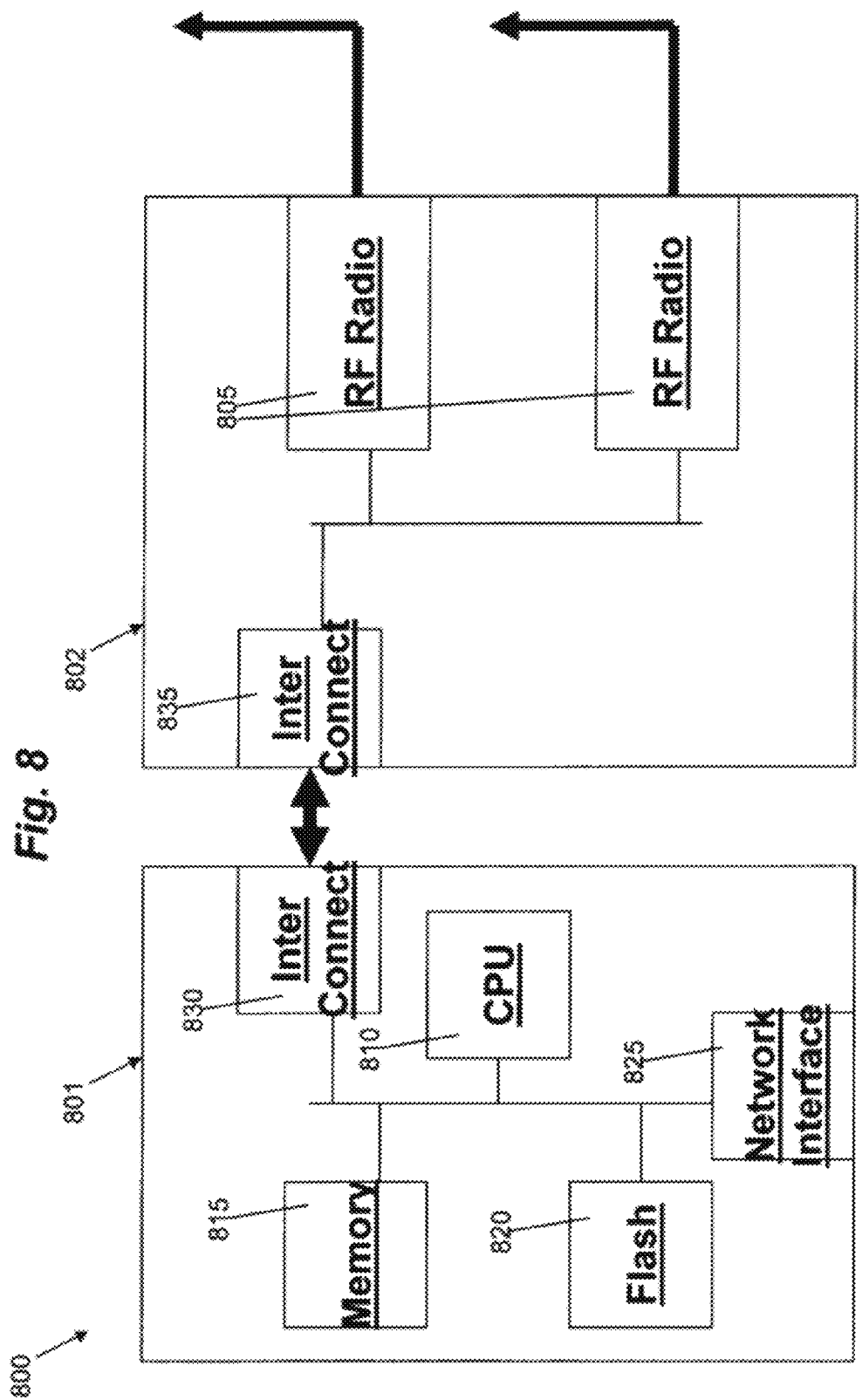

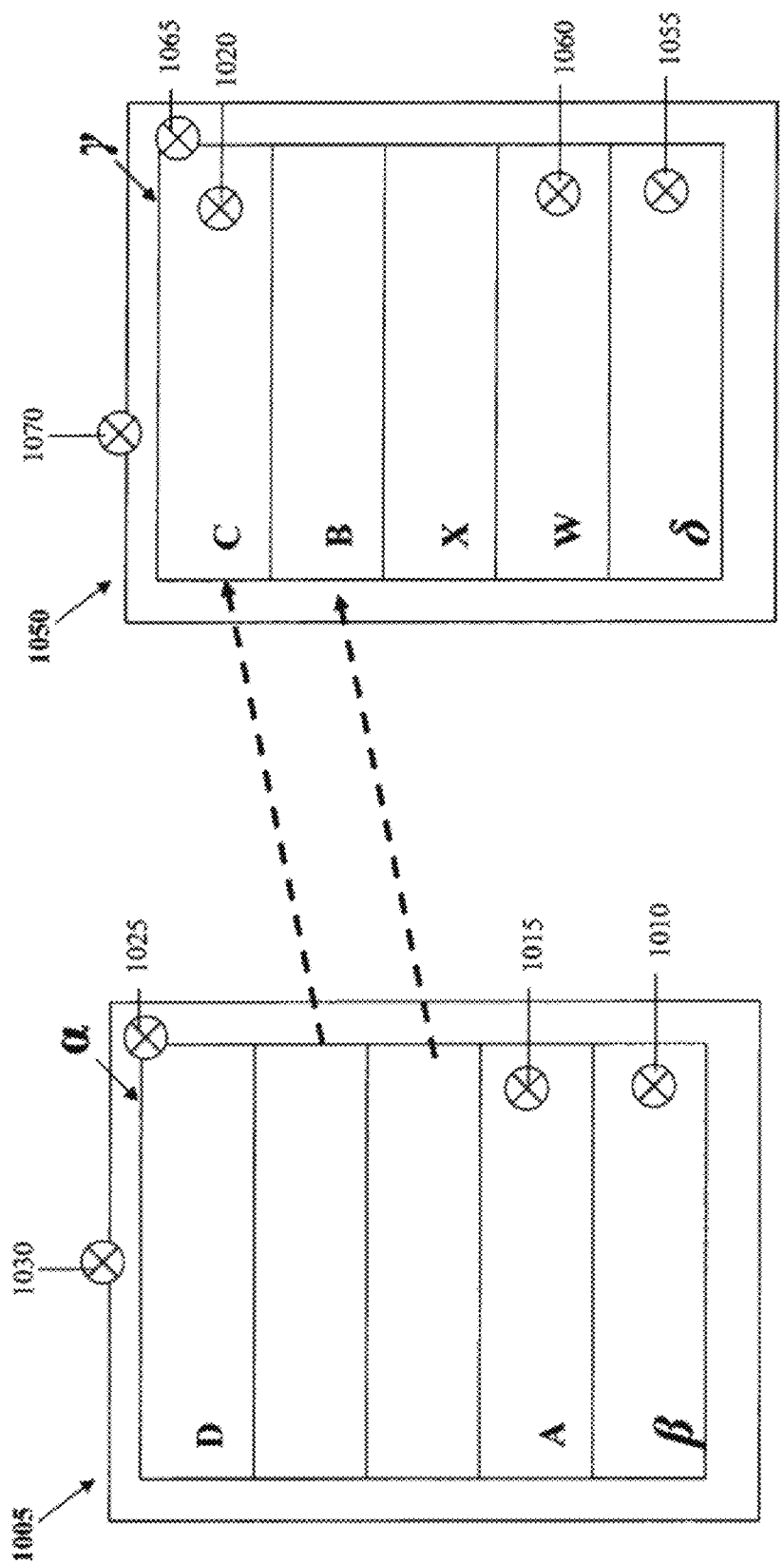

INVENTORY DEVICES AND METHODS

RELATED APPLICATIONS

This application is a divisional application and claims priority from U.S. patent application Ser. No. 11/867,623, entitled "Inventory Devices and Methods," filed on Oct. 4, 2007, by Howarth et al, which is incorporated herein by reference for all purposes.

BACKGROUND OF THE INVENTION

1. Field of the Invention

The present invention relates to inventory devices and methods.

2. Description of the Related Art

Identifying and locating devices within a company can be a time consuming, expensive task. For example, inventorying physical networking assets includes not only the identification of the manufacturer, model number, and serial number of chassis based devices, but also the identification of the internal components, such as modules, blades, and/or daughter boards within those devices. For more complex devices that may include many components, the same device may have many permutations of component numbers and types. It is common for components to be removed from one device and put into another device, e.g., in order to respond quickly to a customer's need for a particular combination of device components.

If one or more components have been removed from a device, they may or may not be replaced. If the components are replaced, the replacements may be improperly configured, may be incompatible with other components, etc. Further challenges are introduced when a customer returns a device to a company. For example, the customer may have removed a more expensive component and replaced it with a cheaper one. Keeping track of all such changes has proven to be very challenging. It would be desirable to address at least some of these shortcomings of the prior art.

BRIEF DESCRIPTION OF THE DRAWINGS

FIG. 8 is a block diagram of an RFID system.

FIGS. 10C and 10D are block diagrams that indicate the contents of the first and second boxes after the process outlined in FIG. 9B.

DESCRIPTION OF EXAMPLE EMBODIMENTS

Overview

Figure 1:
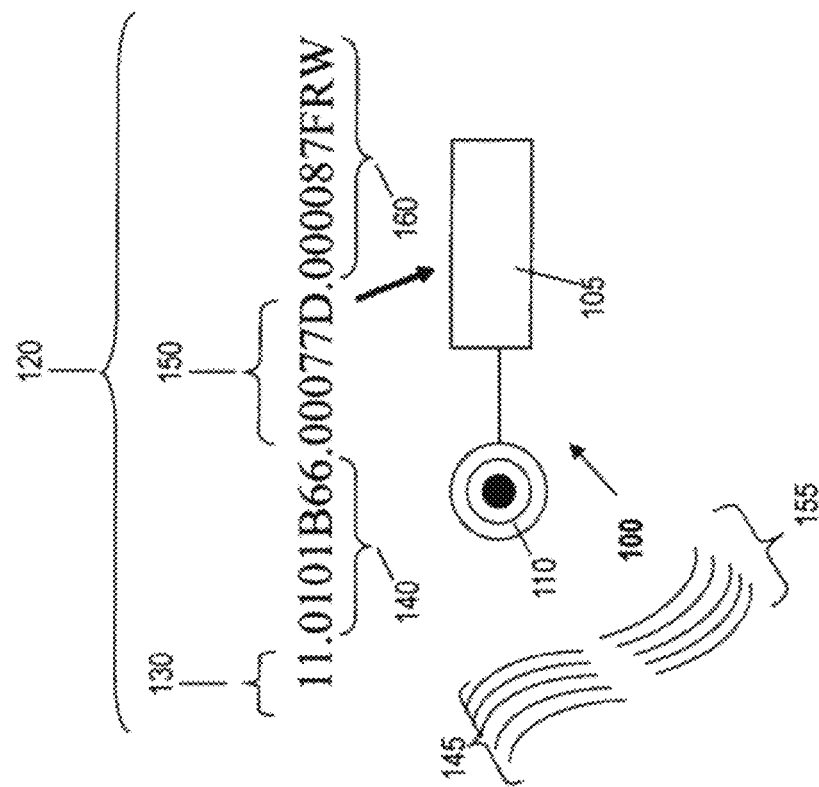
FIG. 1 is a diagram illustrating a radio frequency identification ("RFID") tag.

In one implementation, a method includes reading first component data from a first tag associated with a first component of a device. The device may be powered on or off. The first component data indicate components associated with the first component at a first time. The method may involve obtaining second component data from a second tag associated with a support structure. The second component data may indicate components disposed in the support structure at a second time. The method may also involve comparing the first component data with the second component data and determining whether the first component data match the second component data.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Various techniques and mechanisms of the present invention will sometimes be shown and/or described in singular form for clarity. However, it should be noted that some embodiments may include multiple iterations of a technique or multiple instantiations of a mechanism unless noted otherwise. For example, a system uses a processor in a variety of contexts. However, it will be appreciated that such a system could use multiple processors to perform the same tasks.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection that is illustrated and/or described does not necessarily mean a direct, unimpeded connection unless otherwise noted.

Although some implementations of the present invention involve methods and devices for locating, identifying and inventorying network devices and their components, many implementations of the present invention can be applied to locating, identifying and inventorying other types of devices, including wireless and wired devices, in other types of networks. For example, some implementations of the invention may also be used for locating, identifying and inventorying consumer electronic devices, personal computing devices, telephony devices, etc.

Accordingly, the methods and devices of the present invention have very broad utility, both in the public and private sectors. Any enterprise needs to keep track of how its equipment is being deployed, whether that equipment is used for commercial purposes, for military purposes, etc. Devices that are located, identified and inventoried as described herein can provide necessary information for allowing enterprises to track equipment and products (or groups of products), to determine what enterprise had possession of a device when components were removed and/or substituted, etc. Such information may be of great benefit for enterprise resource planning, including the planning of manufacturing, distribution, sales and marketing, as well as for the resolution of disputes as to when devices have been reconfigured.

Networking assets deployed by a company can currently be identified and located if they are powered on and connected to the network. This can be accomplished via connecting to the device directly or over an IP-based network and requesting such information. For example, Cisco has developed software that allows such identification, e.g., via a "show diag" command to a network device that is powered on and connected to a network (or otherwise in communication with a device issuing the command). A company may also use other mechanisms utilizing the Simple Network Management Protocol ("SNMP") to inventory networking devices that are powered on and connected to a network. Real Time Location Systems ("RTLS") may be used to track and identify the location of objects, such as automobiles, in real time.

When networking equipment is installed but powered off, or when networking equipment is stored at third party integrator or customer warehousing sites prior to deployment within a network, no remote mechanism previously existed to inventory such assets. Inventorying of such equipment was performed by matching purchase orders with physical boxes and by manually opening boxes and/or chassis devices to read part and serial numbers. Device components (e.g., cards, power supply, etc.) would need to be evaluated, possibly removed, scrutinized and compared with a component inventory sheet in order to determine whether all of the proper components were present. This method was highly expensive, time consuming, and error prone.

Some implementations of the present invention provide mechanisms to inventory remotely the physical chassis of a networking device as well as the various cards, modules, and/or blades associated with (e.g., inserted within) the chassis. Some implementations also provide mechanisms to remotely determine the physical location of the asset. Some such implementations of the invention can provide such functionality regardless of whether a main power supply of the physical device is on or off.

RFID

Because some embodiments of the invention employ radio frequency identification ("RFID") technology, the following paragraphs provide a brief description of such technology. Alternative technologies, including Bluetooth™, near-field communications (e.g., near-field magnetics), sensor networks and others not mentioned herein may also be used to gather information from components.

As shown in FIG. 1, an RFID tag 100 includes microprocessor 105 and antenna 110. In this example, RFID tag 100 is a "passive" RFID tag that is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

Most RFID tags use one of the Electronic Product Code ("EPC" or "ePC") formats for encoding information. EPC codes may be formed in various lengths (common formats are 64, 96 and 128 bits) and have various types of defined fields, which allow for identification of, e.g., individual products as well as associated information. These formats are defined in various documents in the public domain. One such document is EPC Tag Data Standards Version 1.1 Rev 1.24, published by EPCglobal® in 2004. EPCglobal® is a joint venture between GS1 (formerly known as EAN International) and GS1 US™ (formerly the Uniform Code Council, Inc.). EPCglobal® is an organization set up to achieve world-wide adoption and standardization of EPC technology.

One example of an RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

Active RFID tags have their own battery and can transmit at higher power levels than passive tags. Therefore, active RFID tags may be more effective in environments that are challenging for RF operation, such as those including metal (e.g., device chassis, shipping containers, etc.). Active RFID tags can transmit signals over relatively longer distances than passive RFID tags: some active tags have practical ranges of hundreds of meters.

Some active RFID tags, known as Class IV and Class V RFID tags, have additional capabilities. Class IV RFID tags may be configured for communication with other active RFID tags as well as with RFID readers. Some Class IV RFID tags may be configured for broad-band communication. Class V RFID tags are essentially readers with extended functionality. Class V RFID tags can power passive RFID tags and can communicate with readers, Class IV RFID tags and other Class V RFID tags.

Some active RFID tags may be configured as read/write RFID tags, which can capture information regarding the history of products or groups of products, e.g., component changes, temperature and other environmental changes, stresses, accelerations and/or vibrations that have acted upon the product. It can be particularly useful to record such information for products that are relatively valuable and/or more subject to theft, spoilage or other damage, such as perishable foods and fragile items.

Some methods of the present invention can be used to provide information to update databases maintained by various entities (e.g., manufacturers, wholesalers, retailers, transportation companies and financial institutions). The information can be used not only to keep track of inventory, but also to resolve disputes (for example, regarding responsibility for component changes, product damage, etc.) to increase customer satisfaction, to avoid health risks, etc.

Collecting and Aggregating Component Information

Various examples of mechanisms are presented herein for the collection and aggregation of component information. For example, some implementations described herein involve collecting and aggregating information regarding components associated with a support structure. In some implementations, the components may be the cards, modules, and/or blades of a network device. The support structure may be the chassis of the network device, a box, a package or another container within which various components are contained. At least some components may be "smart components" configured to acquire and store information regarding other components in the support structure. Some smart components can provide such functionality regardless of whether a main power supply of the device is on or off. Some smart components employ radio frequency identification ("RFID") technology.

RFID Tags Associated with Components

Figure 2A:
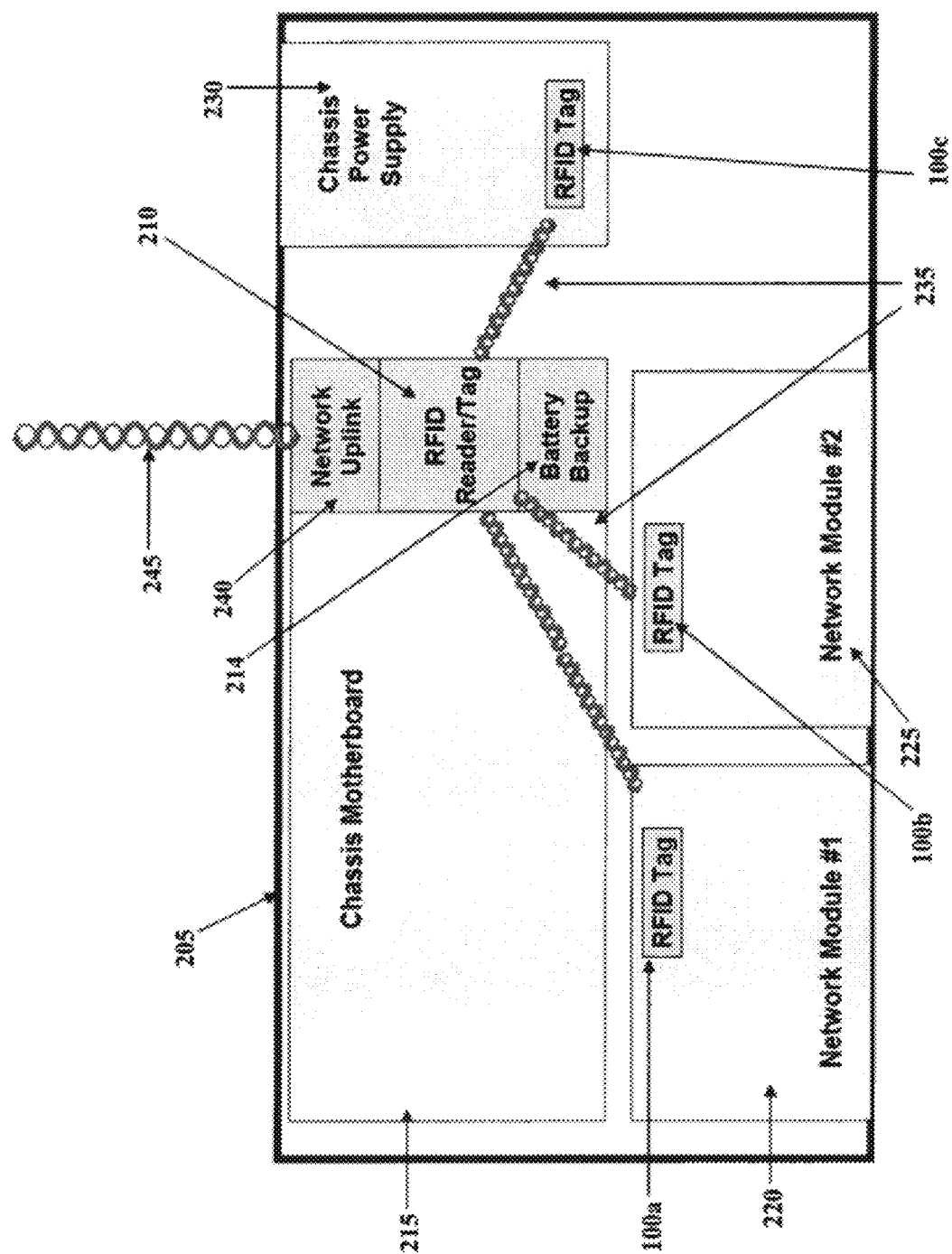
FIG. 2A illustrates an example of a device that may be configured to perform remote inventory functions.

In some examples, RFID tags may be associated with (e.g., attached to) various components of interest within (or near) a support structure. FIG. 2A illustrates one such example. Here, within device chassis 205, each module, daughterboard, blade, power supply, and all other components of interest to inventory management have an associated RFID tag. As described in more detail below, in some implementations not all components will include an RFID tag. The RFID tag may be a passive or an active RFID tag.

In this example, a passive RFID tag similar to RFID tag 100a is attached to component 220. Similarly, passive RFID tag 100b is attached to component 225 and passive RFID tag 100c is attached to power supply 230. Each of the RFID tags includes information regarding the associated component, e.g., the specific instance of the associated component, including a specific serial number of a make and model. The RFID tag may include more detailed information regarding the component's features, specifications, etc. Alternatively, or additionally, the RFID tag may reference more detailed information that is stored in an associated database.

If a component has sub-components of value or interest, the RFID tag of a component may identify the sub-components. In some implementations, some or all of the sub-components may also have associated RFID tags that include information regarding the sub-components.

In some implementations RFID reader 210 may be provided in a format similar to that of existing Personal Computer Memory Card International Association ("PCMCIA") form factors. Alternatively, RFID reader 210 may comprise a tag similar to an EPCglobal® Class IV or Class V RFID tag. RFID reader 210 is preferably configured for communication with motherboard 215, and may be connected to (or even embedded within) the motherboard.

In this example, RFID reader 210 is configured for communication with one or more devices outside of device chassis 205 via network uplink 240. Network uplink 240 may be, for example, a radio frequency uplink, a wireless uplink (e.g., according to one of the Institute of Electrical and Electronics Engineers' ["IEEE"] 802.11 standards), depending on the desired implementation. In some implementations, network uplink 240 comprises one or more active or passive RFID tags associated with RFID reader 210.

As described in more detail elsewhere herein, in this example RFID reader 210 collects and aggregates information from the RFID tags associated with each component (e.g., each daughterboard, blade, power supply, etc.) that is of interest for inventory management. This component information can be transmitted to one or more other devices (e.g., other RFID readers, wireless access points, network devices, host devices, etc.) via network uplink 240. RFID reader 210 preferably stores component information within a non-volatile memory of the RFID reader/aggregation tag (e.g., in a memory similar to non-volatile random access memory ["NVRAM"] 310, shown in FIG. 3A).

It is preferable that the read range should be sufficient to read the RFID tags associated with all components within the support structure and any associated components that may be near the support structure. However, it is also preferable that the read range does not extend far beyond the volume of the support structure in order to avoid reading RFID tags of unrelated components in or near other support structures. In this example, the components of interest are all within chassis 205, so it is desirable that the read volume is large enough to read the RFID tags associated with all components within chassis 205, but is not so large as to read RFID tags associated with components within another chassis.

Accordingly, the particular operating frequency of the RFID tags and/or the antenna gain of RFID reader 210 may be chosen for short-range operation, such that the read volume is the approximate volume of the support structure, e.g., the approximate volume of chassis 205. For example, the operating frequency may be low frequency ("LF"), high frequency ("HF"), ultra-high frequency ("UHF"), etc.)

If network uplink 240 comprises a radio frequency communication link, that link is preferably configured for relatively longer-range communication. However, the communication range may be selected according to the implementation: in some implementations it may be desirable for network uplink 240 to have a relatively short communication range. For example, if many chassis 205 are disposed near one another (e.g., in a warehouse), it may be desirable for network uplink 240 to transmit signals only a relatively short distance, e.g., a few meters.

However, in some situations it may be desirable to configure network uplink 240 and/or the antenna gain of RFID reader 210 for longer-range operation. For example, an operator may wish to determine how many components of a particular type are in a server farm, within a warehouse, etc. As noted elsewhere herein, some active RFID tags have practical ranges of hundreds of meters.

RFID reader 210 preferably includes its own power supply (here, battery backup 214) to enable RFID reader 210 to operate at times when chassis power supply 230 is switched off. Accordingly, battery backup 214 provides the necessary power to periodically activate RFID reader 210 in order to read nearby RFID tags. Additionally, battery backup 214 provides the necessary power to periodically transmit the aggregated information via the uplink and/or respond to a query for aggregated information from an external device. The capacity of battery backup 214 is preferably such that RFID reader 210 can remain un-powered for months at a time and still be able to carry out its function of collecting and sending aggregated inventory information when appropriate.

Here, battery backup system 214 is configured to recharge from chassis power supply 230 when chassis power supply 230 is switched on. When chassis power supply 230 is on, RFID reader 210 may be powered from chassis power supply 230 directly off the main power supply of the device, or from battery backup system 214.

As described in more detail below with reference to FIG. 9A et seq., in some implementations more than one component will include an aggregation device, which may or may not comprise an RFID tag/reader or a network interface. Such components may be termed "smart components" because they are capable of determining and storing information regarding other components. For example, a smart component may determine and store information regarding other components associated with (e.g., in, on or near) the same support structure. Some smart components will determine and store information regarding other components when the motherboard is powered on. Other smart components can determine and store information regarding other components even when the motherboard is powered off.

Figure 2B:
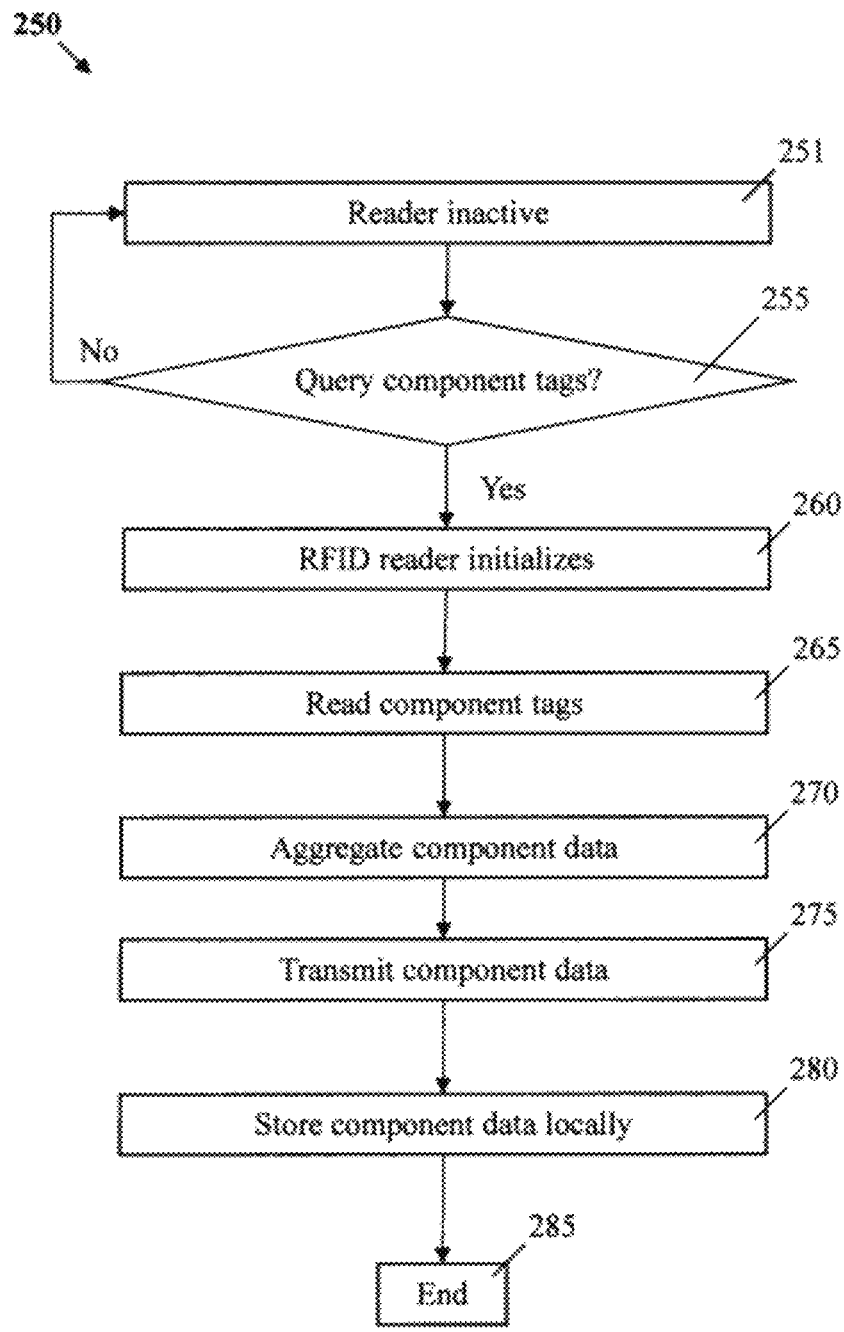
FIG. 2B is a flow chart that outlines a process that the device of FIG. 2A may perform.

A method 250 of operating RFID reader 210 is outlined the flow chart of FIG. 2B. The steps of the methods discussed herein, including but not limited to method 250, need not be performed (and in some implementations are not performed) in the order shown. Moreover, some implementations of the methods discussed herein may include more or fewer steps than those shown or described.

In step 251, part or all of RFID reader 210 is inactive. In some implementations, the antenna portion of the reader is inactive, but one or more logic devices (e.g., processors), timers, etc., are active.

In step 255, RFID reader 210 determines whether to query RFID tags associated with components. RFID reader 210 may make this determination in various ways, according to the implementation. For example, RFID reader 210 may make the determination of step 255 in response to an indication that a predetermined period of time has elapsed. In such examples, RFID reader 210 may receive the indication from another device, from its own timer, etc. The predetermined period of time may be, for example, defined by a factory default, but is preferably configurable by a customer, network manager, etc. For example, the period of time may be configured when the chassis is powered on. Alternatively, the period of time may be remotely configurable according to commands received via a network interface. In some examples, predetermined period of time may be based upon the expected life of battery backup 214 when the device is un-powered.

However, RFID reader 210 may make the determination of step 255 in alternative ways. For example, RFID reader 210 may make the determination in response to a signal from another device, e.g., an RF signal, a wireless signal, a near-field magnetic signal, etc. RFID reader 210 may receive the signal via network uplink 240 or via another interface.

In this example, when it is time to query the components' RFID tags, RFID reader 210 initializes (step 260) and reads the component tags. (Step 265.) RFID reader 210 collects and aggregates component data from all tags within the chassis. (Step 270.) In some implementations, the component data may include information obtained from motherboard 215, e.g., as described below.

The component data may include, but are not limited to, the component's manufacturer, the component's model name and/or number and; the component's serial number. The component data may comprise a Unique Identifier (UID), (e.g., similar to a Serialized General Trade Item Number ["SGTIN"] code as defined by EPCGlobal®) which can be used in place of the manufacturer, model number and serial number. The values corresponding to the UID can be assigned by the manufacturer and may be used, e.g., where security concerns make it inadvisable to disclose the manufacturer, model number and serial number. In some such implementations, the transmission of the correlation of the UID to manufacturer, model number and serial number may be done via secure mechanisms, such as online query by the end-customer after authentication by the manufacturer.

Optionally, additional information may indicate whether the particular component is a "known" component that was identified (e.g., by the firmware of the device) when chassis power supply 230 was last powered on. This information may be obtained, for example, from a non-volatile memory of RFID reader 210, of motherboard 215, etc. A logic device (e.g., of RFID reader 210, of motherboard 215, of another device that receives the data via network uplink 240) may compare the components detected in step 265 and the "known" components in order to determine whether any new or different components have been detected in step 265.

In some instances, RFID reader 210 will detect the RFID tags of components other than known components in step 265. Identifying such previously unknown components can reduce the possibility that a spurious tag read from a component associated with another chassis is attributed to chassis 205. On the other hand, if RFID reader 210 does not detect a known component in step 265, the process may also indicate that an existing component is no longer associated with (e.g., has been removed from) chassis 205, or that the component is still associated with chassis 205 but that RFID reader 210 did not successfully read its RFID tag.

When chassis power supply 230 is powered on, additional information may indicate whether the component is currently powered on and "seen" by the firmware of the device. Comparing the components detected in step 265 with those identified can be useful for correlation between existing online mechanisms for inventory management and/or failure identification of a particular component.

In step 275, the aggregated component data are transmitted via network uplink 240. If comparisons such as those previously mentioned (e.g., comparing known components with components whose RFID tags are read in step 265) are performed locally, some implementations of the invention involve filtering the component data before transmission. For example, a local logic device may filter component data according to a predetermined rule set designed to detect tag reads from nearby chassis. In one such example, if RFID reader 210 detects 3 chassis power supplies 230, but only one is a known component, the RFID tag reads from the other two power supplies may be filtered out prior to transmission. Alternatively, or additionally, another device (such as an RFID middleware server) may provide such filtering.

In some implementations, component data are transmitted only when indicated, e.g., in response to a query from another device, after a predetermined time has elapsed, etc. Preferably, at least some of the component data are stored in a local non-volatile memory. (Step 280.)

Obtaining Component Data from a Local Memory

Instead of, or in addition to, obtaining component data via reading RFID tags, bar codes, etc., some implementations of the invention involve obtaining component data from a local memory that may not be associated with an RFID reader or other aggregation device. Many devices from manufacturers are bench tested with their current configurations before being shipped to customers; these current configurations may be stored in a non-volatile memory. Accordingly, if there is no subsequent modification of components, inventory can be accurately assessed, e.g., for devices that are stored within boxes in warehouse-type environments.

Figure 3A:
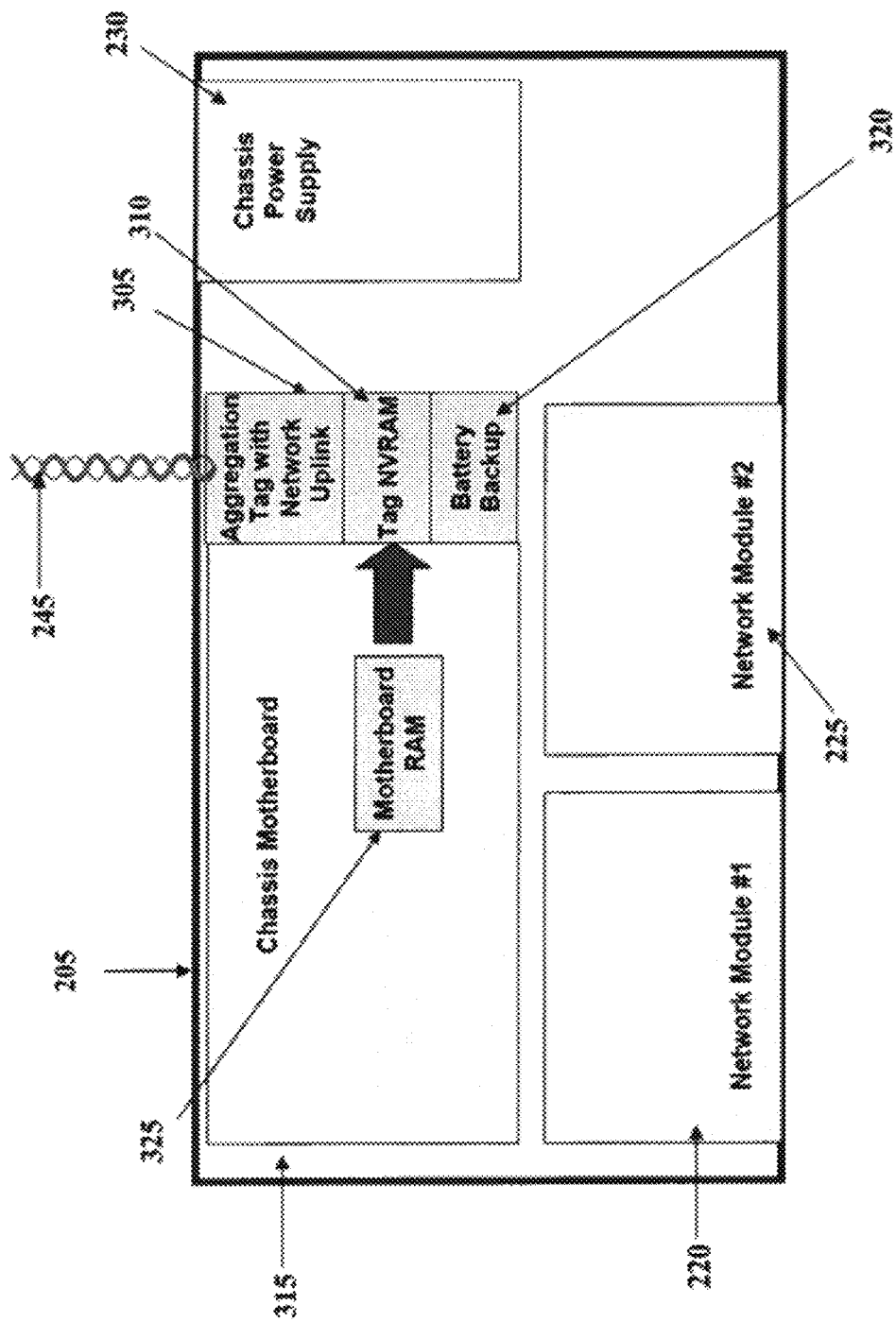
FIG. 3A illustrates an example of another device that may be configured to perform remote inventory functions.

One example of obtaining component data from a local memory will now be described with reference to FIG. 3A. When chassis power supply 230 is on, chassis motherboard 315 may be configured to collect information regarding the various cards, modules, blades and/or other components that are in communication with chassis motherboard 315. Here, chassis motherboard 315 is configured to collect information regarding components 220 and 225, chassis power supply 230 and other components (not shown), and to store this component information in RAM 325.

Aggregation device 305 may collect and aggregate component information directly from RAM 325 when chassis power supply 230 is powered on. Aggregation device 305 may comprise an aggregation tag, similar to an EPCglobal® Class IV or Class V RFID tag. However, aggregation device 305 does not necessarily comprise an aggregation tag or any type of tag. More generally, aggregation device 305 may comprise one or more logic devices (such as processors, programmable logic devices, etc.) configured to perform functions such as those described herein, associated memory, one or more network interfaces, etc. Aggregation device 305 is configured for communication with RAM 325 via a wired or wireless connection. In some embodiments, aggregation device 305 is connected to motherboard 315 and may be embedded within motherboard 315.

Figure 3B:
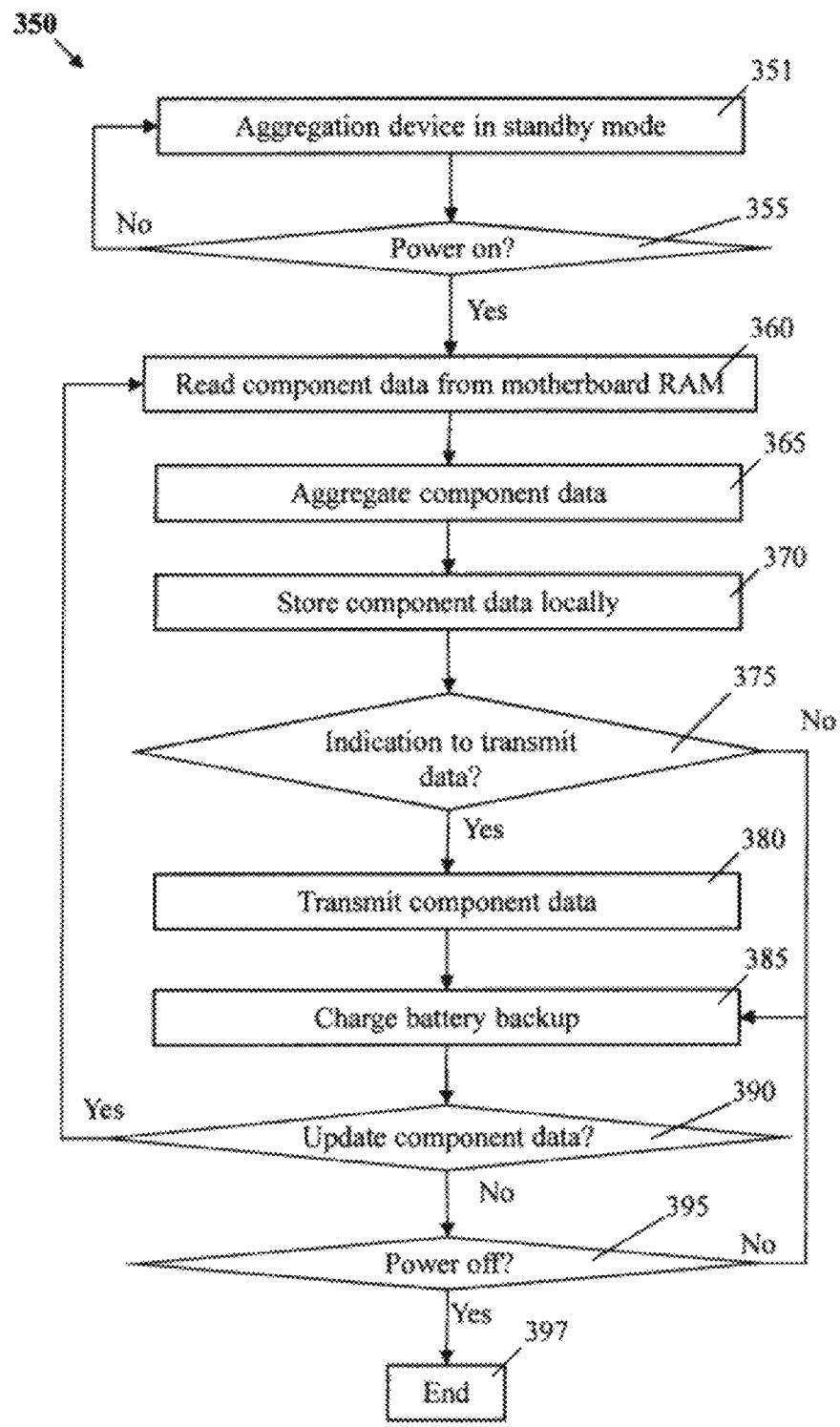
FIG. 3B is a flow chart that outlines a process that the device of FIG. 3A may perform.

FIG. 3B is a flow chart that describes functions that may be performed by aggregation device 305 and related devices. In this example, aggregation device 305 is in standby mode (step 351) until chassis power supply 230 is switched on. (Step 355.) Preferably, aggregation device 305 is still able to provide component data when indicated (e.g., in response to a query from another device, after a predetermined time has elapsed, etc.) when chassis power supply 230 is switched off, because aggregation device 305 can be powered by battery backup 320. In some implementations, the components of aggregation device 305 that perform steps of method 350 may be inactive, but other components may be active. For example, one or more logic devices, timers, etc., may be active.

When chassis power supply 230 is switched on, aggregation device 305 may read component data from RAM 325 (step 360), aggregate these data, if necessary (step 365) and store the component data in NVRAM 310. (Step 370.)

In step 375, it is determined whether there is an indication to transmit component data via a network uplink of aggregation device 305. If so, these data are transmitted (step 380). For example, aggregation device 305 may determine whether there has been a query for component data from another device. Aggregation device 305 may determine whether a predetermined time until a planned transmission has elapsed. In some implementations, aggregation device 305 will transmit component data whenever they are received from motherboard RAM 325. Even when chassis power supply 230 is subsequently powered off, aggregation device 305 has preferably stored the last known configuration of the device and can provide component data when indicated. In this example, battery backup 385 charges while chassis power supply 230 is powered on. (Step 385.)

If there is an indication that component data have been updated (step 390), aggregation device 305 may read the updated component data from motherboard RAM 325. (Step 360.) For example, a motherboard CPU may be configured to send a signal to aggregation device 305 when motherboard RAM 325 indicates a new component, that a component has been removed, etc. In some such implementations, warm configuration changes to the device may also automatically update motherboard RAM 325, triggering aggregation device 305 to again query motherboard RAM 325.

Collecting Component Data Via Hardware Connections

One drawback of collecting component data only from motherboard RAM 325 is that components may be changed when a chassis power supply 230 is off. In some such implementations, when aggregation device 305 subsequently transmits component data, the component data may not indicate the change in configuration. As noted above, some implementations overcome this problem by collecting component data from motherboard RAM 325 and other sources, e.g., RFID tags, sensors, etc. on components of interest.

Figure 4:
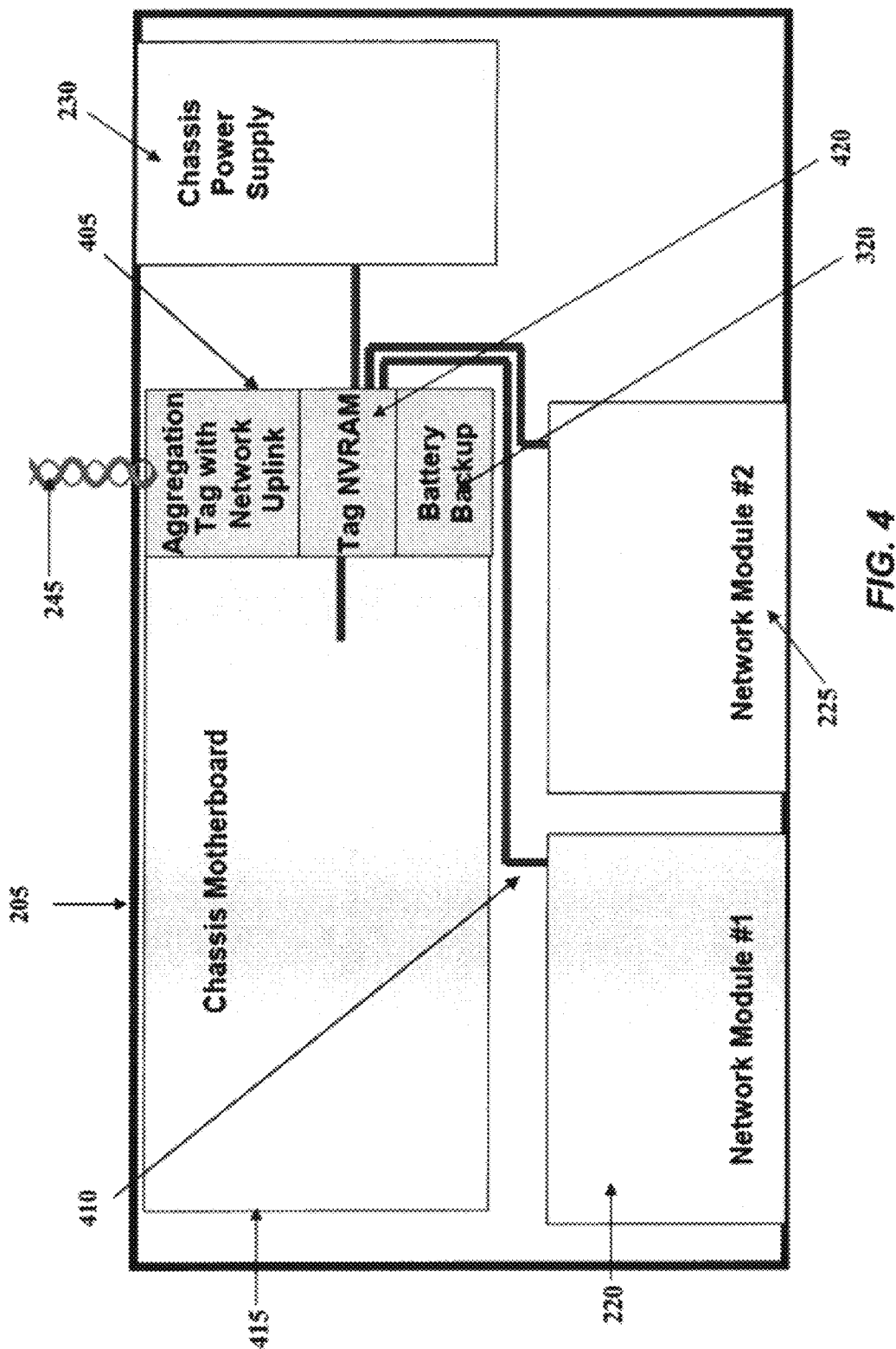
FIG. 4 illustrates an example of another device that may be configured to perform remote inventory functions.

In alternative embodiments, hardware connections may be disposed between components and an aggregation device in order to overcome this issue. One such embodiment is illustrated in FIG. 4. In this example, hardware connections 410 are made from aggregation device 405 to every component of interest within chassis 205, including components 220 and 225, chassis power supply 230 and motherboard 415. Hardware connections 410 may comprise pins, for example. Via hardware connections 410, aggregation device 405 may collect and aggregate information directly from each component of interest within chassis 205. When a component is removed, the corresponding hardware connection 410 is broken, so aggregation device 405 is aware of the removed component. The component information may then be stored within NVRAM 420.

In this example, battery backup system can provide power to aggregation device 405 when chassis power supply 230 is powered off. Regardless of whether chassis power supply 230 is powered on or off, aggregation device 405 can collect data directly from hardware connections 410, store the current configuration of the device in NVRAM 420 and provide component data via a network uplink when indicated.

Transmitting Inventory Information Across a Network

Figure 5:
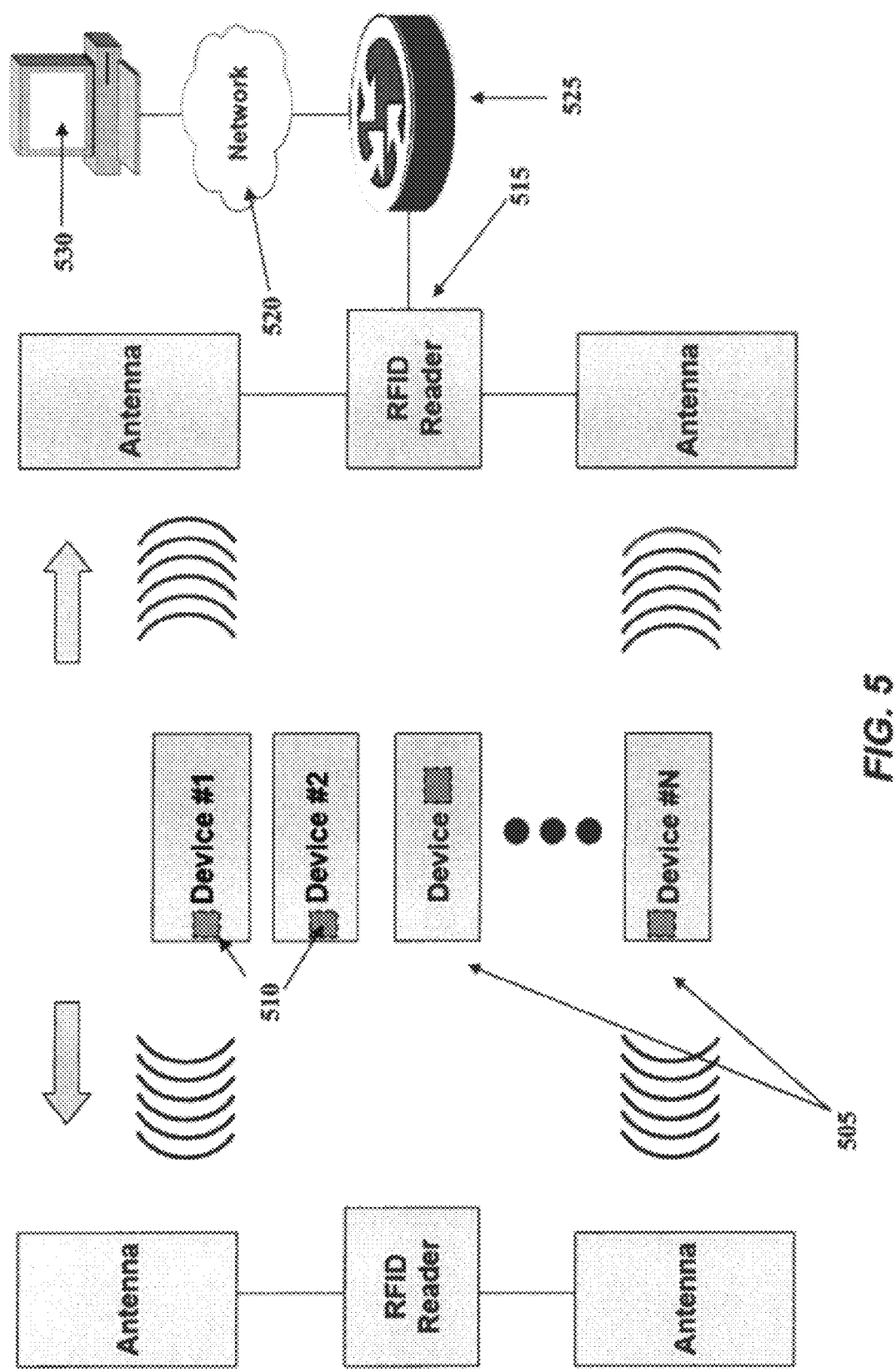
FIG. 5 is a network diagram that illustrates the uplink of inventory data via RFID.

FIGS. 5 and 6 show two examples of networks for transmitting aggregated inventory information to application servers and other devices in a network. In the example depicted in FIG. 5, the uplink is implemented via RFID technology, using passive or active RFID tags, or a combination thereof. If RFID tags 510 are active RFID tags, RFID readers 515 can reliably receive RF signals at a relatively greater distance, e.g. on the order of 100 meters or more. For example, relatively fewer RFID readers 515 may be strategically placed within storage rooms, warehouses, equipment labs, data center locations, etc. As described elsewhere herein, readers 515 may periodically query the devices 515 via RFID tags 510. Devices 505 may respond with aggregated component data, preferably utilizing a battery backup system to power the responding devices (e.g., the aggregation devices and/or active RFID tags) when the main power supplies of the devices are off.

In some implementations of the invention, a device may have more than one component with an aggregation device. For example, a motherboard and one or more components may each have an aggregation RFID tag that indicates component data. The component data may include information not only regarding the component having the RFID tag, but also regarding other components associated with that component. FIGS. 10A through 10E provide examples of some such embodiments.

Utilizing passive RFID technology, readers 515 would need to be placed in closer proximity to passive RFID tags 510, possibly within 5 meters or less given the current state of passive RFID technology. However, the uplink operation may be similar. Readers may periodically query the network device, which can respond with the aggregated data. However, a battery backup system is not utilized to power passive RFID tags 510. Instead, the RF energy from the external reader is used.

In both such scenarios, the physical location of the device can be determined by the RFID reader antenna that received the aggregated data. Network devices 525 convey the component data via network 520 to other devices, such as host device 530 of an inventory management system. In this example, network 520 is an IP-based network, but network 520 may be any convenient type of network. Some network devices 525 may be switches, RFID middleware servers and other such devices. In one such example, one or more middleware servers are implemented via the Cisco AON™ for RFID solutions running on a network device such as a router.

Some such network devices 525 can explicitly add detailed location or other information to the component data. In some examples, the information may be added in the form of "ECReports": an ECReports object is generated by a single activation of an event cycle within an application level event ("ALE") engine. The contents of ECReports are defined by the event cycle specification (ECSpec) that defined the event cycle. Alternatively, or additionally, the information may be added in the form of EPC information services ("EPCIS") events. Such implementations provide additional benefits as compared to traditional online mechanisms for inventory management, which rely on a text string manually coded into the device, indicating its current location.

Figure 6A:
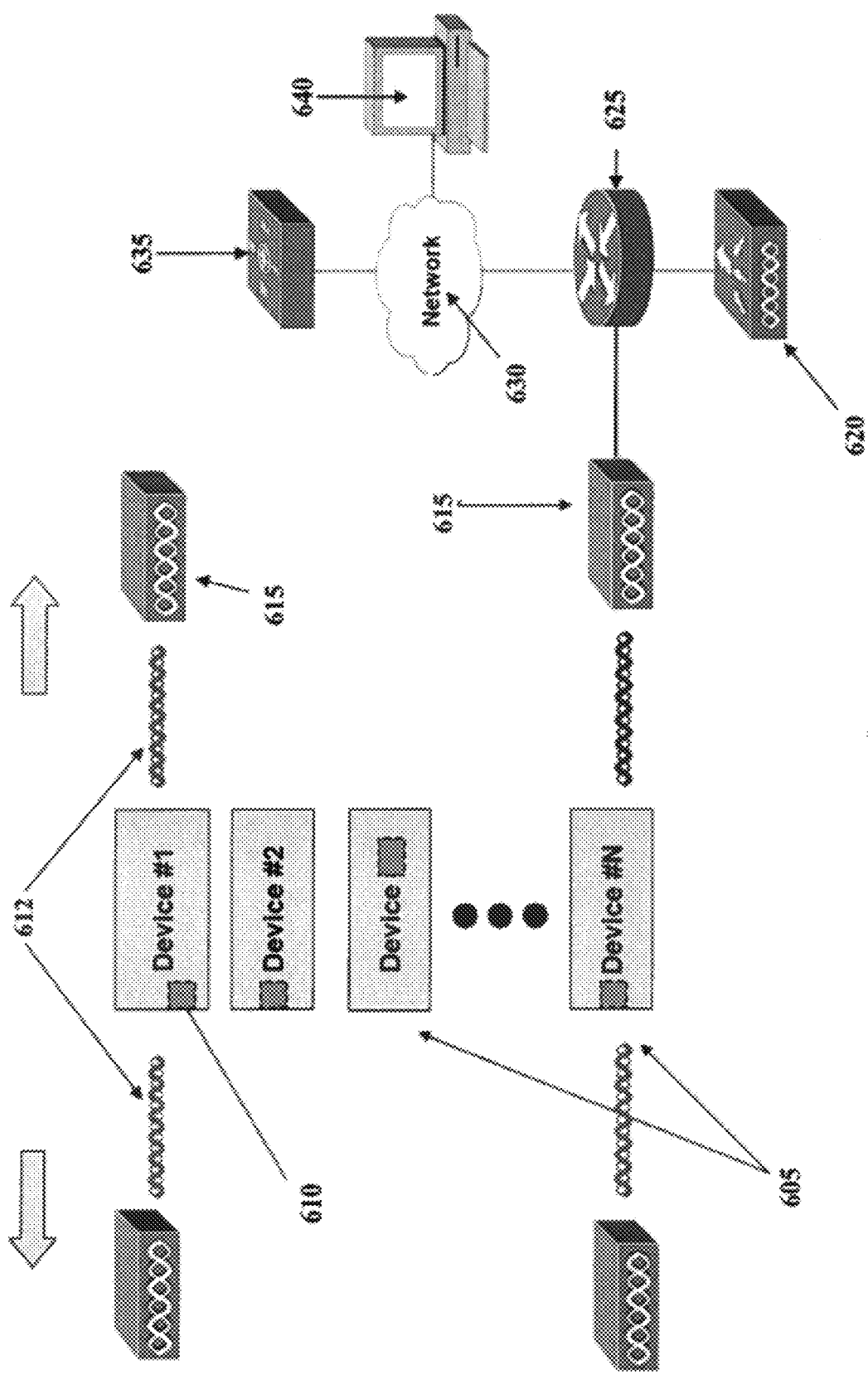
FIG. 6A is a network diagram that illustrates the uplink of inventory data via 802.11 technology.

In the example depicted in FIG. 6A, the uplink is implemented via 802.11 technology, preferably using an extension of existing 802.11 location-based services. As used herein, the terms "802.11" and the like refer to a set of wireless local area network ("WLAN") standards developed by working group 11 of the IEEE Standards Committee (IEEE 802). The referenced standards include, but are not limited to, the original IEEE 802.11 standard, which is now sometimes called "802.11 legacy."

According to such methods, the existing 802.11 infrastructure of a warehouse, storage room, lab, data center, or other location can be used to collect inventory information. Using a modified version of an existing 802.11 infrastructure avoids the expense of installing separate RFID readers and related RFID devices. Moreover, existing 802.11-based asset location and tracking systems can be extended, if so desired, to include detailed inventory information.

In the example illustrated in FIG. 6A, each of devices 605 includes an aggregation device 610 having an 802.11 uplink. Wireless access points 615 form communication links between the uplinks of aggregation devices 610 and other devices, including WLAN controller 620 and network device 625, via wired or wireless links. Network device 625 may comprise, for example, a switch or a router that is in communication with other devices via network 630, such as location server 635 and host device 640 of an inventory management system. The location server may be, e.g., a Cisco 2700 series location server.

Figure 6B:
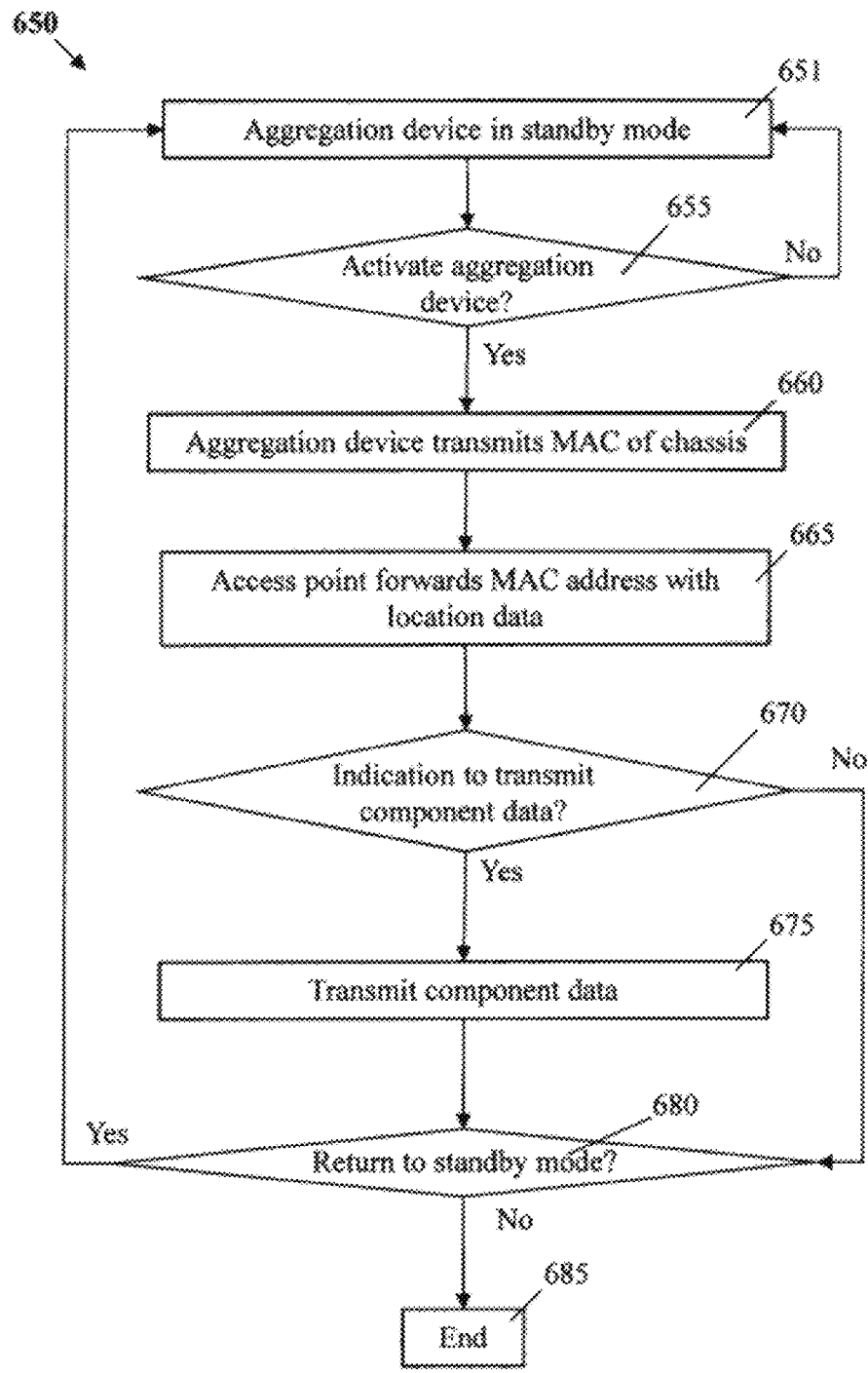
FIG. 6B is a flow chart that outlines a process that devices in the network of FIG. 6A may perform.

FIG. 6B illustrates one method 650 for networking aggregation devices 610 via 802.11 uplinks. In step 651, an aggregation device 610 is in a standby mode. At this stage, aggregation device 610 has already performed some method (e.g., as shown and described elsewhere herein) for obtaining, aggregating and storing component data. However, in some implementations, aggregation device 610 may nonetheless obtain and aggregate the component data after activation, in order to obtain the most recent version of the component data.

In this example, the uplink of an aggregation device 610 periodically becomes active. Here, the uplink becomes active according to an indication (e.g., by a timer of aggregation device 610) that a predetermined period of time has elapsed. However, in alternative implementations, the uplink of an aggregation device 610 becomes active in response to a signal from another device.

In step 660, the uplink transmits a media access control ("MAC") address of a chassis of corresponding device 605. (See signal 612.) In some implementations, the uplink includes location information, or other information from which a location may be determined, with the MAC address. However, in this example, the nearest access point 615 provides such location information. (Step 665.) Another device, such as WLAN controller 620, may provide related information, e.g., regarding the current location of the access point. Here, location server 635 is configured to receive the included location information, to translate and/or interpret the location information as needed and to provide human-readable and/or machine-readable location information to an inventory management system.

In FIG. 6A, only host device 640 of the inventory management system is shown. In practice, there may be many other devices associated with an inventory management system, including servers, storage devices, additional host devices, etc.

Instead of immediately returning to standby mode, in this example aggregation device 610 remains active for a predetermined length of time. If aggregation device 610 receives an indication to transmit component data within this predetermined length of time, aggregation device 610 may transmit these data. (Step 675.) For example, location server 635, a third party application server or host device and/or a device of an inventory management system may query aggregation device 610 for inventory information.

If security is a concern, aggregation device 610 may transmit one or more codes, such as UIDs, which must be matched to a database to have meaning In situations wherein higher-level security is desired, the uplink may be required to form an association with the access point before transmitting such information. Such association may include encryption capabilities.

If aggregation device 610 does not receive an indication to transmit component data within the predetermined length of time (or after transmission), aggregation device 610 may return to standby mode (as determined in step 680). Aggregation device 610 may make and store a record of the component data transmission and/or perform other functions, if indicated, before returning to standby mode.

As described elsewhere, aggregation devices 610 are preferably provided with battery backup systems that allow aggregation devices 610 to function when the other components of devices 605 are powered off. The capacity of the battery is preferably such that the devices 605 can be un-powered for a significant length of time (e.g., weeks, months or even years) and still be able to transmit aggregated inventory data.

Figure 7:
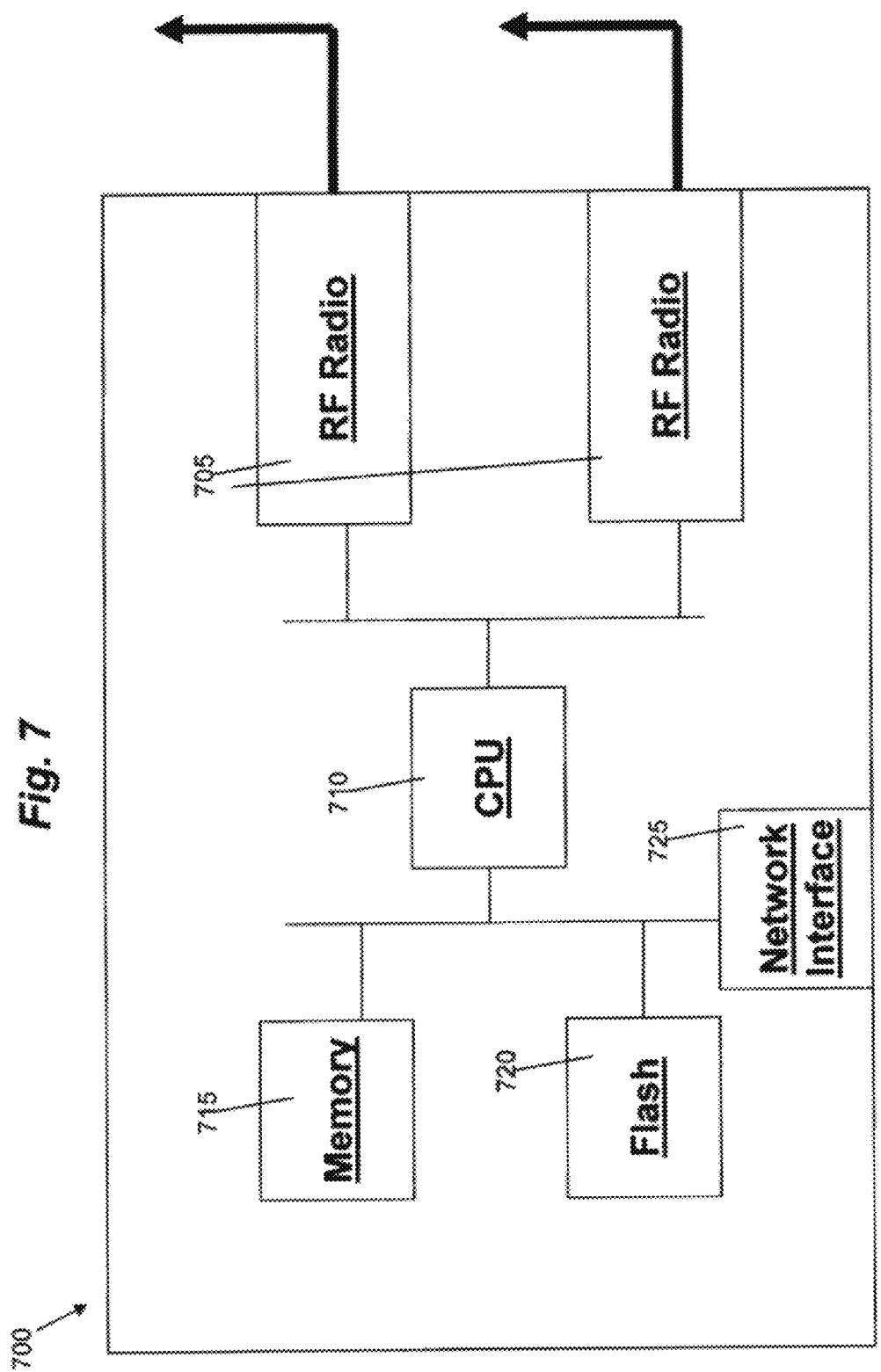
FIG. 7 is a block diagram of an RFID reader.

FIG. 7 illustrates an RFID reader that can be configured to perform methods of the present invention. RFID reader 700 includes one or more RF radios 705 for transmitting RF waves to, and receiving modulated RF waves from, RFID tags. RF radios 705 can provide raw RF data that is converted by an analog-to-digital converter (not shown) and conveyed to other elements of RFID reader 700. In some embodiments, these data are stored, at least temporarily, by CPU 710 in memory 715 before being transmitted to other parts of an RFID network via network interface 725. Network interface 725 may be any convenient type of interface, such as an Ethernet interface.

Flash memory 720 is used to store a program (a "bootloader") for booting/initializing RFID reader 700. The bootloader, which is usually stored in a separate, partitioned area of flash memory 720, also allows RFID reader 700 to recover from a power loss, etc. In some embodiments of the invention, flash memory 720 includes instructions for controlling CPU 710 to form "DHCPDISCOVER" requests to initiate a provisioning/configuration cycle. In some implementations, flash memory 720 is used to store personality information and other configuration information obtained from, e.g., a DHCP server during such a cycle.

However, in preferred implementations, such information is only stored in volatile memory 715 after being received from, e.g. a DHCP server. There are advantages to keeping RFID devices "dumb." For example, a network of dumb RFID devices allows much of the processing load to be centralized, instead of being performed by the RFID devices. Alternatively, the processing load can be decentralized. In some such implementations, at least some processing may be performed only by trusted devices.

Configuration information is downloaded from, e.g., a central server to memory 715. Updates may be instigated by the central server or selected, trusted devices. New versions of the image file (e.g., the running, base image necessary to operate the RFID device) may be copied into flash memory 720. Alternative embodiments of RFID devices implement the methods of the present invention yet may lack flash memory.

Some RFID devices also include dry contact input/output leads to connect with signal lights, industrial networks or the equivalent. Such RFID devices typically have evolved in the amount of memory, flash, CPU capacity and methods of determination of the number, type and content of RFID tags in their field of view.

FIG. 8 illustrates RFID system 900 that includes control portion 801 and RF radio portion 802. In this example, the components of control portion 801 are substantially similar to those described above with reference to FIG. 7. Interconnect 830 of control portion 801 is configured for communication with interconnect 835 of RF radio portion 802. The communication may be via any convenient medium and format, such as wireless, serial, point-to-point serial, etc. Although only one RF radio portion 802 is depicted in FIG. 8, each control portion 801 may control a plurality of RF radio portions 802. RFID system 800 may be deployed on a single framework or chassis (e.g., on a forklift) or in multiple chassis.

Figure 9A:
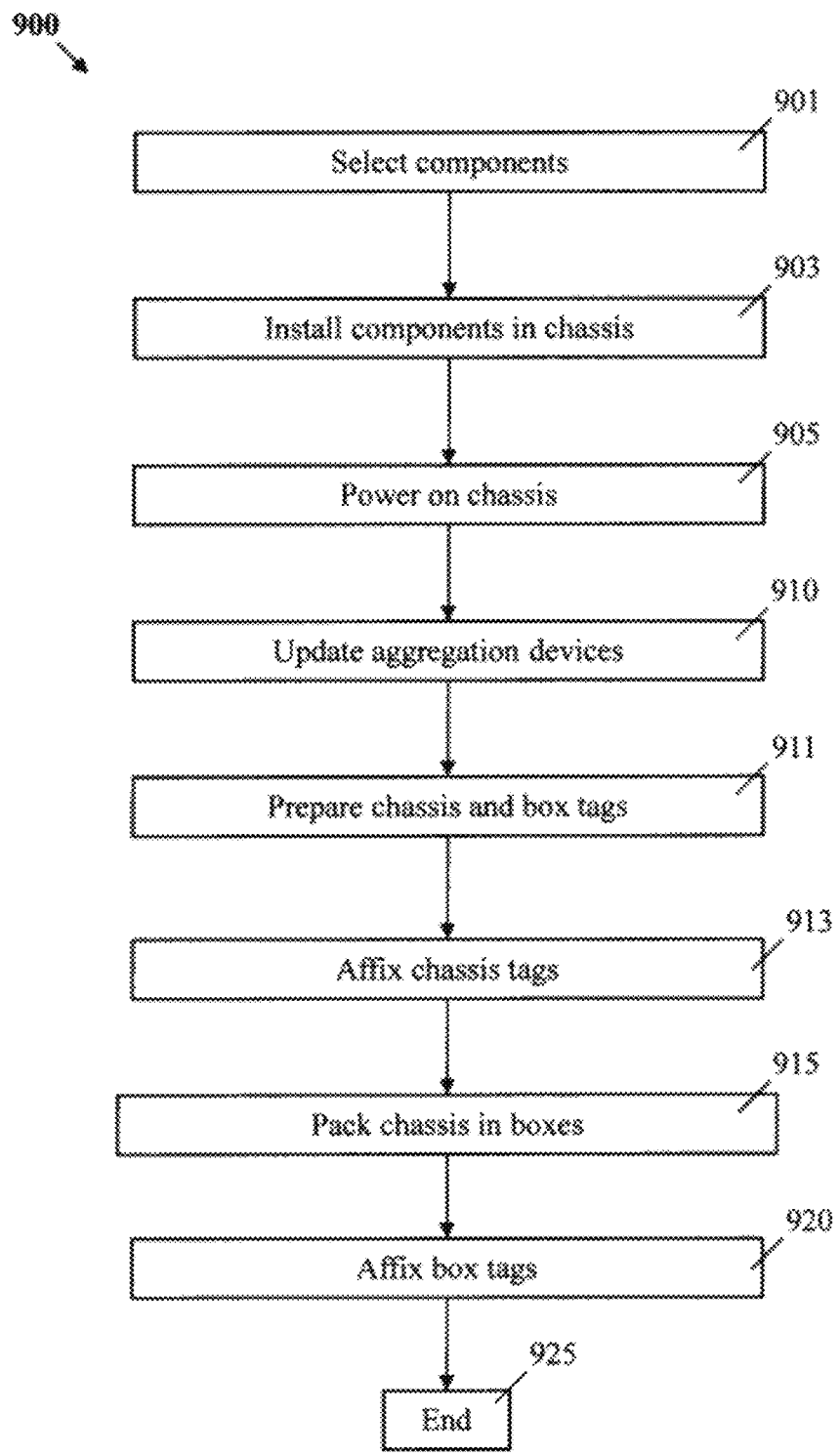
FIG. 9A is a flow chart that outlines a process of installing smart components in first and second device chassis and packing first and second boxes that include the first and second device chassis.

FIG. 9A is a flow chart that outlines a process of installing components, including smart components, in device chassis and support structures (such as packing boxes) that include the device chassis. Complex devices, e.g., network devices such as routers and switches, may have many interchangeable components. Rarely are the same combinations of components installed, or put in precisely the same slot pattern, in different instances of the same device. A variety of other components (e.g., peripheral devices, cabling, batteries, adaptors, external memory, etc.) may be associated with a device chassis. Such components may or may not be packed in the same box as the device chassis.

In step 901, device components are selected for each chassis. The components may be selected according to any of various criteria, e.g., according to customers' specifications, according to component combinations that are known to be popular, etc. Some device components may be "smart components" that include an aggregation device such as described above. Other device components may be able to identify themselves (and possibly to identify associated components), e.g., via a read-only tag such as a read-only passive RFID tag. However, some components may not be able to identify themselves or other components.

The selected components are installed in and/or associated with the appropriate chassis (step 903). The chassis power supply is preferably switched on (step 905) in order to test the device as configured. The motherboard may be able to identify each installed device. The aggregation devices can be updated with component, motherboard and chassis information, e.g., according to one of the previously-described methods. (Step 910.)

In this example, some type of tag is prepared for each support structure, i.e., for each chassis and each box. (Step 911.) (The term "box" is used generically herein to include any type of container, crate, etc., in which a device chassis may be packed, regardless of its size or the type of material involved.) Here, the tags indicate the contents of the respective support structure: the chassis tags indicates the components in the chassis, whereas the box tag identifies the chassis and its components. The box tag may be, for example, some type of RFID tag or even a sticker with a bar code. In some implementations, the box tag may be disposed on the outside of a box. However, the box tags and the chassis tags are not necessarily affixed to the corresponding support structures. For example, a box tag may be affixed to a shipping document, an invoice, etc. A chassis tag may be associated with a chassis and/or included in a box with the chassis, but is not necessarily attached to the chassis. The chassis tag is preferably an RFID tag, so that it is readable when enclosed in the box.

However, in this example, a chassis tag is affixed to each chassis (step 913) and each chassis is packed into a box. (Step 915.) A box tag is affixed to each box. (Step 920.)

Figure 10B:
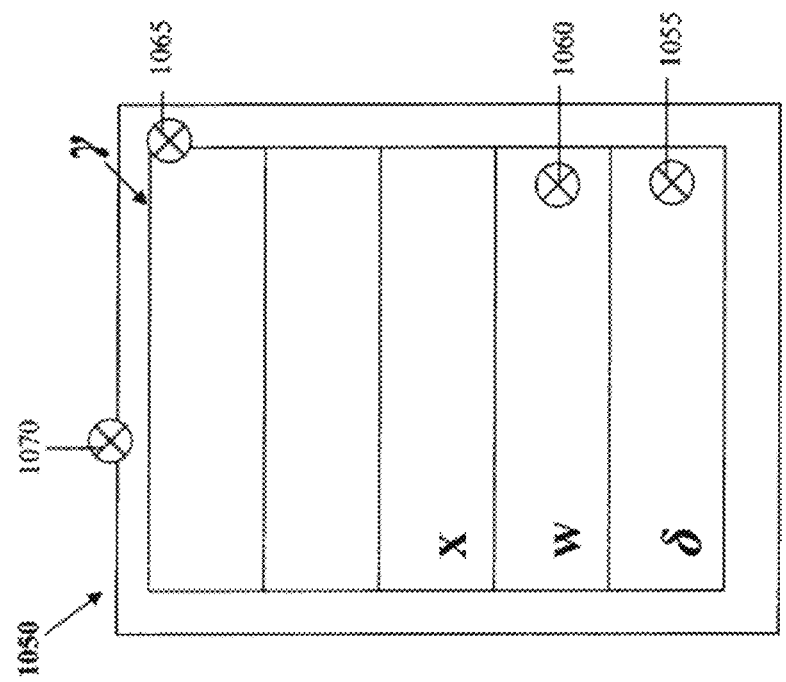
FIGS. 10A and 10B are block diagrams that indicate the contents of the first and second boxes after the process outlined in FIG. 9A.
Figure 10A:
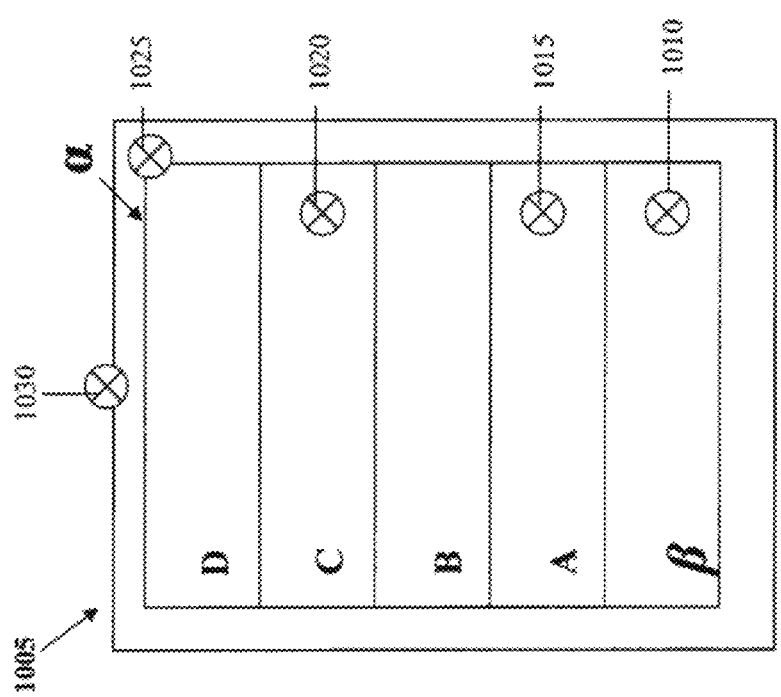

FIGS. 10A and 10B are block diagrams that indicate the contents of two boxes after the process outlined in FIG. 9A. Chassis α has been packed in box 1005 of FIG. 10A. Chassis α includes motherboard β and components A, B, C and D.

Motherboard β and components A and C have corresponding aggregation devices 1010, 1015 and 1020, respectively. For example, aggregation devices 1010, 1015 and 1020 may comprise RFID tags, such as Class IV or Class V RFID tags. Here, aggregation device 1010 indicates that motherboard β includes components A, B, C and D. The amount of information regarding each device depends on the implementation, as described above. Similarly, aggregation device 1015 indicates that component A is installed in a device having motherboard β and components B, C and D. Aggregation device 1020 indicates that component C is installed in a device having motherboard β and components A, B and D. In some implementations, component aggregation devices may be configured to indicate, and/or to obtain information from, a chassis tag or a box tag.

In this example, chassis tag 1025 indicates that chassis a includes motherboard β and components A, B, C and D. In this example, chassis tag 1025 is an RFID tag. Box tag 1030 indicates that box 1005 contains chassis α, which in turn includes motherboard β and components A, B, C and D. Box tag 1030 may comprise an RFID tag, a printed bar code, etc.

Referring now to FIG. 10B, box 1050 contains chassis γ, which includes motherboard δ and components W and X. Accordingly, aggregation device 1055 indicates that motherboard δ includes components W and X. Aggregation device 1060 indicates that component W is installed in a device having motherboard δ and component X. Chassis tag 1065 indicates that chassis γ includes motherboard δ and components W and X. Box tag 1070 indicates that box 1050 contains chassis γ, which in turn includes motherboard δ and components W and X.

At this stage, if someone were to read the tags of box 1005 or box 1050, the component data from each of the tags and aggregation devices would properly cross-correlate. For example, each component aggregation device would correctly reference the associated components and motherboard, and the actual chassis within which these components are disposed. Each chassis tag and box tag would correctly identify the components contained within. Preferably, an identification number for each box and information regarding its contents are logged into a database, e.g., by reading the box tags and storing the information read from the box tags.

Figure 9B:
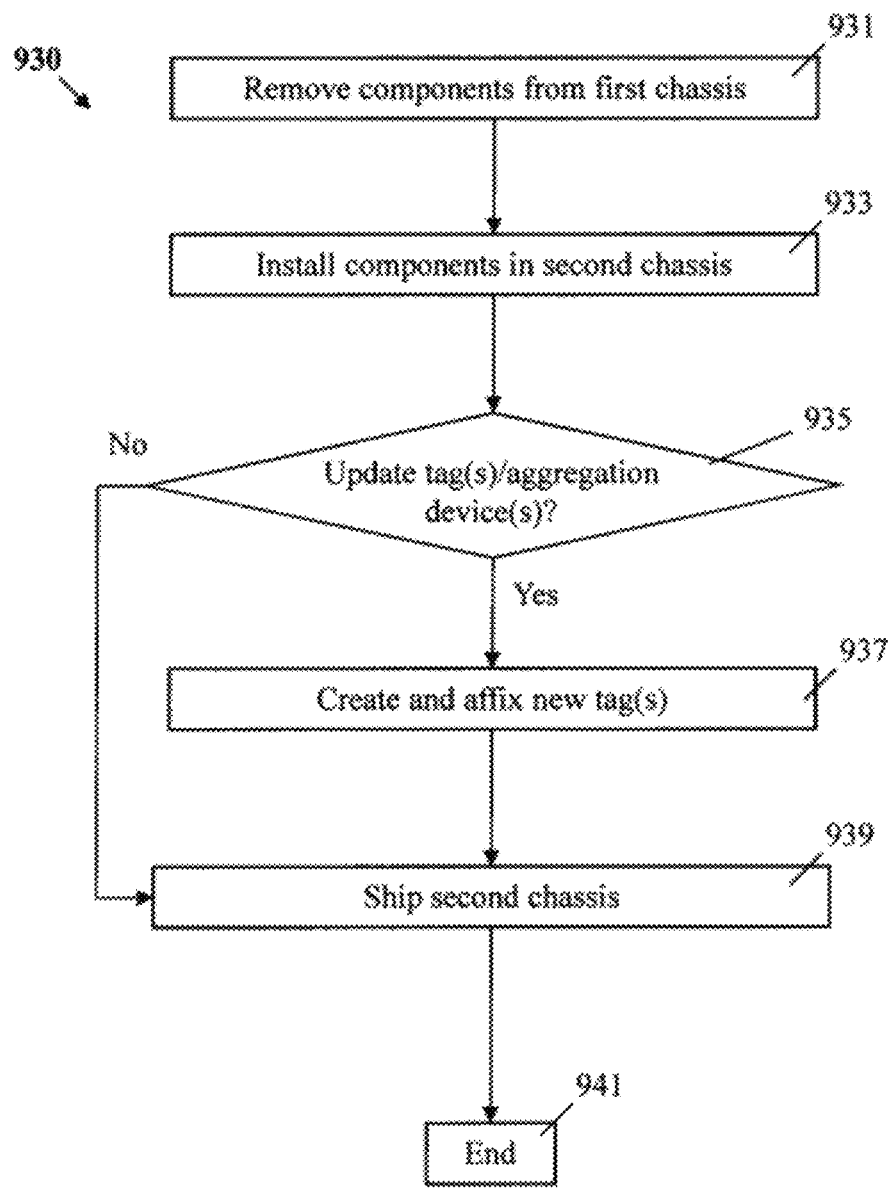
FIG. 9B is a flow chart that outlines a process of removing some smart components from the first device chassis, installing the smart components in the second device chassis and shipping the second device chassis.

FIG. 9B is a flow chart that outlines a process of removing some components from a first device chassis, installing the components in the second device chassis and shipping the second device chassis. It is common for components to be removed from a chassis after the chassis is packed into a box and presumed to be ready for delivery. Components may be removed from a packed box for a number of reasons.

In this instance, after packing many chassis and components in boxes (including boxes 1005 and 1050) according to the process described with reference to FIG. 9A, an order has come in for a device that includes motherboard δ and components W, X, B and C. A warehouse employee determines (e.g., by referring to a box/contents database, by reading box tags, etc.) that box 1050 contains motherboard δ and components W and X.

The employee then determines that components B and C are not in stock, except for those already installed in chassis and packed in boxes. Rather than order components B and C and await their delivery, the employee decides to expedite shipment of the requested device by opening box 1005, removing components B and C from chassis α and installing these components in chassis γ. (Step 933.)

FIGS. 10C and 10D are block diagrams that indicate the contents of boxes 1005 and 1050 after step 933. FIG. 10C illustrates box 1005 with components B and C removed; FIG. 10D illustrates box 1050 with components B and C added. Note that because aggregation device 1020 is affixed to smart component C, aggregation device 1020 is now inside chassis α.

Time permitting, it would be preferable for the employee to power up chassis γ and test the device with the new components. This would also allow motherboard δ to discover that chassis γ now includes components B and C. Aggregation devices 1010, 1015, 1020, 1055 and 1060 could be updated to indicate their new contexts, even if these devices depend on power from the main chassis power supply for their operation. It would also be preferable to update chassis tags 1025 and 1065, as well as box tags 1030 and 1070, to indicate the actual contents of these support structures. (See step 937 of FIG. 9B.)

However, in this instance the employee decides not to do any of these things. (Decision node 935.) The employee does not take the time to power up chassis γ and test the device. Likewise, the employee updates neither the chassis tags nor the box tags. Instead, the employee closes boxes 1005 and 1050, and ships box 1050 with the existing tags.

Figure 9C:
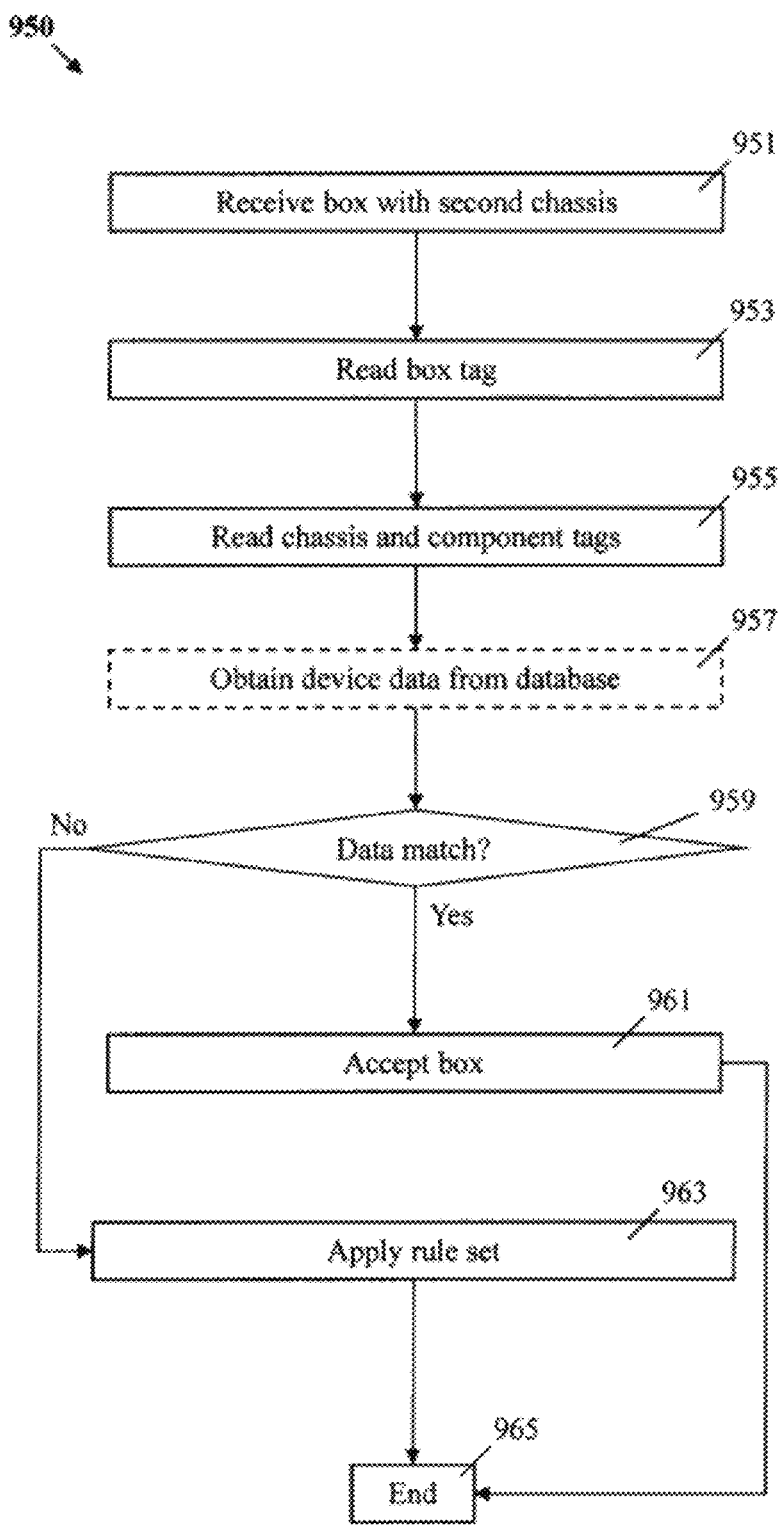
FIG. 9C is a flow chart that outlines a process of taking an inventory of the contents in the second box after receipt.

FIG. 9C is a flow chart that outlines a process of evaluating the contents of box 1050 after it has been received by anyone in the supply chain with the necessary equipment. For example, the steps of process 950 may be performed by an employee of the customer that ordered the device, by an intermediary such as a shipping company, a distributor, etc. The equipment may comprise, for example, one of the RFID readers depicted in FIG. 5, 7 or 8. Preferably, the RFID reader (or other device) is configured for communication with a network, to allow access to a database of device and component information and/or delivery information. In some instances, the device may be a hand-held RFID reader having one or more interfaces configured for wireless connections with, e.g., a network, a controller, storage devices, one or more host devices, etc.

In step 951, box 1050 is received. In this example, the box is received by an employee of the customer that has placed the order for a device that includes motherboard δ and components W, X, B and C. The employee reads box tag 1070 (step 953), as well as chassis tag 1065 and aggregation devices 1020, 1055 and 1060. (Step 955.) Preferably, the employee can read chassis tag 1065 and aggregation devices 1020, 1055 and 1060 without opening box 1050.

If the employee has access to such information, the employee may also obtain component data from a database such as that maintained by the warehouse that shipped box 1050. (Step 957.) The employee may also reference a product description on an invoice, an order sheet, or the like.

In step 959, it will be determined whether the data match closely enough for the box to be accepted (step 961). What constitutes a "close enough" match may, for example, be configurable by a user, may be a matter of judgment on the part of the operator, or may be established in some other way.

In this case, box tag 1070 indicates that box 1050 contains chassis γ, which includes motherboard δ and components W and X. Chassis tag 1065 also indicates that chassis γ includes motherboard δ and components W and X.

The information provided by aggregation devices 1020, 1055 and 1060 will depend on whether they are capable of updating themselves without having the power supply of chassis γ powered on and, if they have this capability, whether they have done so. As discussed elsewhere herein, in some implementations an aggregation device will check for updates upon the occurrence of one or more predetermined events, e.g., after the passage of a predetermined time.

In this example, the component aggregation devices will seek information about associated components and the motherboard only when the main power supply of the chassis is on. Because the motherboard's main power supply has not been turned on since components B and C were added to chassis γ, aggregation devices 1020, 1055 and 1060 indicate their context at an earlier time. Aggregation device 1055 indicates that motherboard δ includes components W and X, but does not mention component B or component C. Aggregation device 1060 indicates that component W is installed in a device having motherboard δ and component X; again, aggregation device 1060 indicates neither component B nor component C. Aggregation device 1020 indicates that component C is installed in a device having motherboard β and components A, B and D.

Here, the customer's employee is expecting to take receipt of a device that includes components W, X, B and C. In this example, there is a sufficient mis-match that further action will be taken according to a predetermined rule set. (Step 963.) The action taken may depend on the rule set, the amount of employee discretion, the amount of other information available to the employee, etc. For example, the employee may contact the entity that configured and shipped chassis γ, may access a database of chassis data and related component data, may open box 1050 and power on chassis γ to allow the aggregation devices to update themselves, may open the chassis γ and visually inspect the components, etc.

In this example, pursuant to one or more of these procedures, the employee decides to accept box 1050. In this example, the steps described with reference to FIG. 9C were taken by an employee of the customer that ordered the device. Depending on factors such as the size of the customer's organization, the steps of FIG. 9D could be performed by the same person and/or by other people who work for the company. In this example, the steps of method 970 are performed, at least in part, by one or more people in a computer services department.

Box 1050 is unpacked (step 971), then chassis γ is powered on. (Step 973.) In this example, chassis γ has not been powered on since components B and C were added to chassis γ. As previously noted, in this example the component aggregation devices will obtain information about associated components and the motherboard only when the main power supply of the chassis is on.

Therefore, powering on chassis γ can cause aggregation devices 1020, 1055 and 1060 to be updated according to their new contexts. (Step 975.) Motherboard δ may discover that it is now configured for communication with components W, X, B and C. Aggregation device 1055 may be updated to indicate this fact. In this example, aggregation device 1060 will indicate that component W is installed in a device having motherboard δ and components X, B and C. Similarly, aggregation device 1020 will indicate that component C is installed in a device having motherboard δ and components W, X and B. In some implementations, a chassis tag or even a box tag may also be automatically updated to indicate the present configuration of chassis component, but such devices are not automatically updated in this example.

The device is operated for a period of time. (Step 975.) The device may be tested, evaluated, configured for communication with other device, a network, etc. However, at some point a decision is made to return the device. (Step 977.) Accordingly, the device is powered off. (Step 979.)

It is quite common for customers to remove components of interest, such as expensive or otherwise desirable components, prior to returning a device. In this instance, the customer decides keep component C. Therefore, the customer removes component C from chassis γ and inserts outdated component H in its place. (Step 981.) The customer then puts chassis γ in a box and ships it back to the seller. (Step 983.) The box may or may not be the box in which chassis γ was originally shipped; in this example, the same box is used.

Figure 9D:
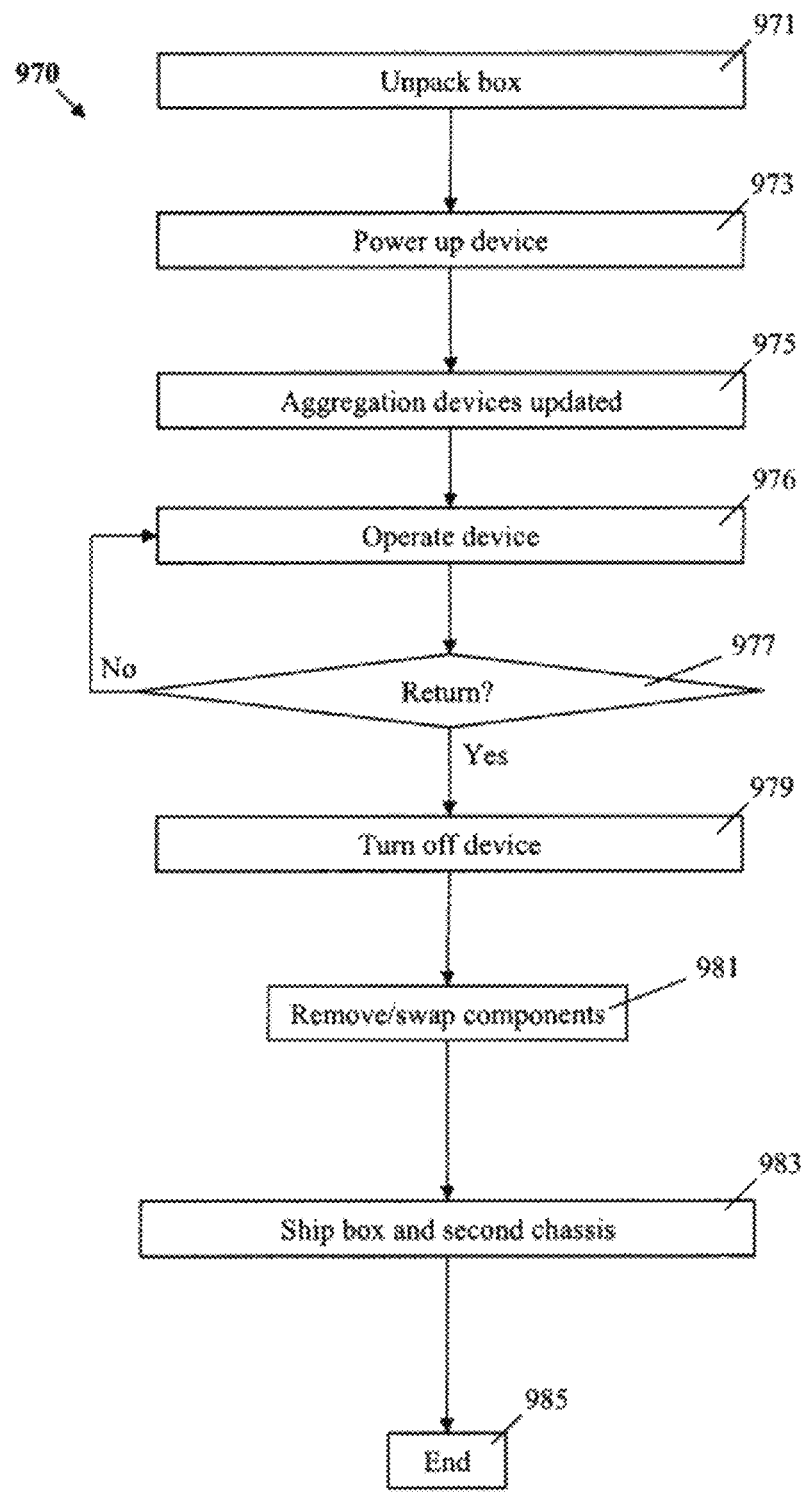
FIG. 9D is a flow chart that outlines a process of updating component data indicated by the smart components, replacing one of the components of the second chassis and sending back the second chassis.
Figure 10E:
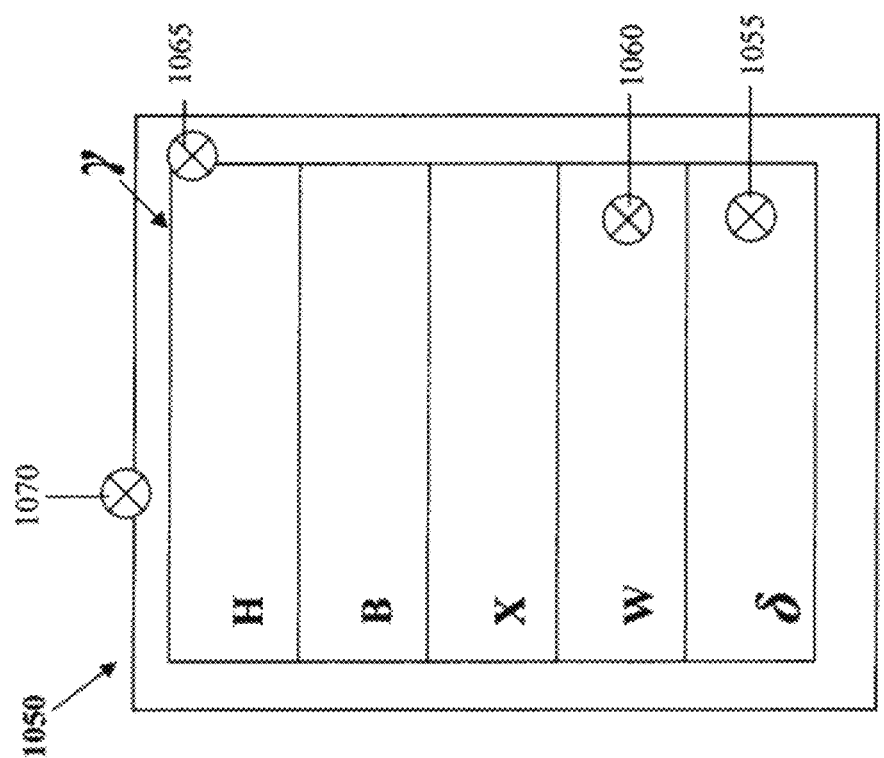
FIG. 10E is a block diagram that indicates the contents of the second box after the process outlined in FIG. 9D.

FIG. 10E is a block diagram that indicates the contents of the second box after the process outlined in FIG. 9D. Because component C has been removed from chassis γ and replaced with component H, aggregation device 1020 has also been removed from chassis γ.

When chassis γ is received by the seller, or by an intermediary such as a distributor, a shipping company, etc., a process such as that of FIG. 9C may be performed. After the box is received (step 951), the box tag 1070 will be read (step 953), along with the chassis tag 1065 and aggregation tags 1055 and 1060. (Step 955.) If available, device data (such as chassis and component data) may be obtained from a database such as that maintained by the seller's warehouse. (Step 957.)

Information on an invoice, an order sheet, a waybill or the like may be referenced to determine the purported contents of box 1050.

In step 959, it will be determined whether the data match closely enough for the box to be accepted (step 961). Again, what constitutes a "close enough" match may, for example, be configurable by a user, may be a matter of judgment on the part of the operator, or may be established in some other way. Different entities may establish different standards in this regard. For example, if process 950 is performed by the seller, its relationship with the customer may influence the rule set to be applied and/or may be the basis for exceptions to normal rules. A valued customer may, for example, be granted a certain degree of leeway in returning devices with the wrong components. On the other hand, if a distributor, a transportation company, etc., could be held liable for accepting devices with missing or incorrect components, such entities may decide to enforce relatively strict rules regarding devices with missing or incorrect components.

In this example, process 950 is being performed by the seller. Here, box tag 1070 still indicates that box 1050 contains chassis γ, which includes motherboard δ and only components W and X. Similarly, chassis tag 1065 still indicates that chassis γ includes motherboard δ and only components W and X. Aggregation device 1055 indicates that motherboard δ includes components W, X, B and C. Aggregation device 1060 indicates that component W is installed in a device having motherboard δ and component X, B and C. Aggregation device 1020 is missing, along with component C.

Here, the seller's employee is expecting to take receipt of a device that includes components W, X, B and C. In this example, there is a sufficient mis-match that further action will be taken according to a predetermined rule set. (Step 963.) The action taken may depend on the rule set, the amount of employee discretion, the amount of other information available to the employee, etc. In this example, the employee opens box 1050 and chassis γ and visually inspects the components. After the employee discovers that component C has been replaced with component H, the employee decides to contact the customer to resolve the discrepancy. The customer may be charged an additional amount of money, may be asked to return component C, etc.

Other Embodiments

The methods of the present invention may be implemented, at least in part, by hardware and/or software. For example, some embodiments of the invention provide computer programs embodied in machine-readable media. The computer programs include instructions for controlling one or more devices to perform the methods described herein.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A method, comprising:
   determining first component data by a first aggregation device at a first time, the first aggregation device being associated with a first one of a plurality of device components of a device, the first component data comprising identification data regarding at least a second one of the plurality of device components of the device;
   storing the first component data;
   receiving a component request; and
   providing the first component data in response to the component request;
   wherein the determining, storing, receiving, and providing steps are performed when the device is powered off;
   wherein the plurality of device components are disposed within a device chassis;
   wherein the device chassis has associated therewith a chassis RFID tag, the chassis RFID tag indicating chassis component data regarding the plurality of device components disposed within the device chassis, wherein the first aggregation device is separate from the chassis RFID tag.

2. The method of claim 1, wherein the first aggregation device comprises a radio frequency identification (RFID) tag.

3. The method of claim 1, wherein the second one of the plurality of device components has associated therewith a radio frequency identification (RFID) tag, the RFID tag having second component data stored thereon, the second component data indicating at least one other component associated with the second one of the plurality of device components.

4. The method of claim 1, wherein a motherboard is configured for communication with the plurality of device components, the motherboard comprising a second aggregation device configured to obtain current component data from each of the plurality of device components when the device is powered on.

5. The method of claim 4, further comprising:
   obtaining by the first aggregation device current component data from the second aggregation device.

6. The method of claim 1, wherein the first aggregation device comprises a wireless interface, wherein the component request is received via the wireless interface, and wherein the first component data is provided via the wireless interface.

7. The method of claim 1, wherein the chassis RFID tag is affixed to the chassis.

8. The method of claim 1, further comprising:
checking that the chassis component data is consistent with the first component data.

9. An apparatus, comprising:
a device chassis;
a plurality of device components disposed within the device chassis; and
a first aggregation device associated with a first device component, the first aggregation device comprising a wireless interface and a logic device configured to do the following when the apparatus is powered off:
determine first component data at a first time, the first component data comprising identification data regarding at least a second device component that is currently disposed within the device chassis;
store the first component data;
receive a component request via the wireless interface; and
provide the first component data via the wireless interface in response to the component request;
wherein the device chassis has a chassis RFID tag associated therewith, the chassis RFID tag indicating chassis component data regarding the plurality of device components disposed within the chassis, wherein the first aggregation device is separate from the chassis RFID tag.

10. The apparatus of claim 9, wherein the first aggregation device comprises a radio frequency identification ("RFID") tag.

11. The apparatus of claim 9, further comprising an RFID tag associated with the second device component, the RFID tag having second component data stored thereon, the second component data indicating at least one other component associated with the second component.

12. The apparatus of claim 9, further comprising a motherboard configured for communication with the plurality of device components, the motherboard comprising a second aggregation device configured to obtain current component data from each of the plurality of device components when the apparatus is powered on.

13. The apparatus of claim 12, wherein the first aggregation device is further configured to obtain current component data from the second aggregation device.

14. The apparatus of claim 9, wherein the chassis RFID tag is affixed to the device chassis.

15. At least one non-transitory computer-readable medium storing thereon computer-readable instructions for performing a method, comprising:
determining first component data by a first aggregation device at a first time, the first aggregation device being associated with a first one of a plurality of device components of a device, the first component data comprising identification data regarding at least a second one of the plurality of device components of the device;
storing the first component data;
receiving a component request via a wireless interface; and
providing the first component data via the wireless interface in response to the component request;
wherein the determining, storing, receiving, and providing steps are performed when the device is powered off;
wherein the device chassis has a chassis RFID tag associated therewith, the chassis RFID tag indicating chassis component data regarding the plurality of device components disposed within the chassis, wherein the first aggregation device is separate from the chassis RFID tag.

16. The non-transitory computer-readable medium of claim 15, wherein the first aggregation device comprises a radio frequency identification (RFID) tag.

17. The non-transitory computer-readable medium of claim 15, wherein the second one of the plurality of device components has associated therewith a radio frequency identification (RFID) tag, the RFID tag having second component data stored thereon, the second component data indicating at least one other component associated with the second one of the plurality of device components.

18. The non-transitory computer-readable medium of claim 15, further comprising:
instructions for obtaining by a second aggregation device current component data from each of the plurality of device components when the device is powered on.

19. The non-transitory computer-readable medium of claim 18, further comprising:
instructions for obtaining by the first aggregation device current component data from the second aggregation device.

20. An apparatus, comprising:
means for determining first component data by a first aggregation device at a first time, the first aggregation device being associated with a first one of a plurality of device components of a device, the first component data comprising identification data regarding at least a second one of the plurality of device components of the device;
means for storing the first component data;
means for receiving a component request via a wireless interface; and
means for providing the first component data via the wireless interface in response to the component request;
wherein the determining, storing, receiving, and providing means are performed when the device is powered off;
wherein the plurality of device components are disposed within a device chassis;
wherein the device chassis has associated therewith a chassis RFID tag, the chassis RFID tag indicating chassis component data regarding the plurality of device components disposed within the device chassis, wherein the first aggregation device is separate from the chassis RFID tag.

* * * * *